US007455106B2

(12) United States Patent
Veneruso et al.

(10) Patent No.: US 7,455,106 B2
(45) Date of Patent: Nov. 25, 2008

(54) POLYMER PROTECTIVE COATED POLYMERIC COMPONENTS FOR OILFIELD APPLICATIONS

(75) Inventors: Anthony F. Veneruso, Paris (FR); Yanmei Li, Pearland, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 426 days.

(21) Appl. No.: 11/221,230

(22) Filed: Sep. 7, 2005

(65) Prior Publication Data

US 2007/0051510 A1 Mar. 8, 2007

(51) Int. Cl.
*E21B 43/00* (2006.01)
(52) U.S. Cl. .............. 166/244.1; 166/242.1; 166/243; 166/381
(58) Field of Classification Search .............. None
See application file for complete search history.

(56) References Cited

U.S. PATENT DOCUMENTS

| | | | |
|---|---|---|---|
| 3,246,627 A | 4/1966 | Loeb et al. | |
| 3,301,707 A | 1/1967 | Loeb et al. | |
| 3,600,216 A | 8/1971 | Stewart et al. | |
| 4,163,828 A | 8/1979 | Mahoney | |
| 4,396,658 A * | 8/1983 | Mettes et al. | 428/35.8 |
| 4,412,028 A * | 10/1983 | Lundberg et al. | 524/364 |
| 5,075,174 A | 12/1991 | Pyle | |
| 5,110,685 A | 5/1992 | Cross et al. | |
| 5,272,007 A | 12/1993 | Jenkinson et al. | |
| 5,345,824 A | 9/1994 | Sherman et al. | |
| 5,459,202 A | 10/1995 | Martinez et al. | |
| 5,461,107 A | 10/1995 | Amin et al. | |
| 5,590,887 A | 1/1997 | Senda et al. | |
| 5,654,084 A | 8/1997 | Egert | |
| 5,694,740 A | 12/1997 | Martin et al. | |
| 6,022,595 A | 2/2000 | McDonald et al. | |
| 6,488,992 B1 | 12/2002 | Boerio et al. | |
| 6,863,124 B2 | 3/2005 | Araux et al. | |
| 6,896,049 B2 | 5/2005 | Moyes | |
| 2007/0027245 A1* | 2/2007 | Vaidya et al. | 524/424 |
| 2007/0044958 A1* | 3/2007 | Rytlewski et al. | 166/250.01 |

FOREIGN PATENT DOCUMENTS

GB 1006753 10/1965
WO WO02/04783 A1 1/2002

OTHER PUBLICATIONS

Chvalun, S.N., "Polymer and Hybrid Nanocomposites by Vapor Deposition Polymerization: Perspectives of Applications", Materials Research Laboratory, University of California, Santa Barbara, date unknown, accessed Aug. 4, 2005 at http://www.mrl.ucsb.edu/mrl/events/seminars.show_seminar.php?key=1110321000Chvalun.

(Continued)

*Primary Examiner*—Zakiya W. Bates
(74) *Attorney, Agent, or Firm*—James L. Kurka; Kevin B. McGoff; Osha, Liang L.L.P.

(57) ABSTRACT

An oilfield element or assembly having a polymeric substrate protected by a polymeric coating adhered to at least a portion of the polymeric substrate. The coating includes a polymer having the formula —$[R(R^1_x)(R^2_y)]$—, wherein: R is selected from C—C, aryl, or —$C(R^3_p)(R^4_q)$-aryl-$C(R^5_r)(R^6_s)$—; $R^1$ and $R^2$ may be the same or different; $R^3$, $R^4$, $R^5$, and $R^6$ are independently selected from halogen atoms and hydrogen atoms; and n is an integer ranging from 10 to 10,000.

18 Claims, 11 Drawing Sheets

OTHER PUBLICATIONS

Cookson Electronics: Specialty Coating System: Electronics http://www.scscookson.com/parylene_applications/electronics.cfm.

Cookson Electronics: Specialty Coating Systems: Rubber/Silicone; http://www.scscookson.com/parylene_applications/rubber-silicone.cfm.

Cookson Electronics: Specialty Coating System: Specifications and Properties; http://www.scscookson.com/parylene_knowledge/specifications.cfm.

Gleason, K.K., "Polymer Nanocoatings by Initiated Chemical Vapor Deposition (iCVD)", Technical Proceedings of the 2005 NSTI Nanotechnology Conference and Trade Show, vol. 2, Chapter 5: Surfaces and Films (Abstract).

"Parylene Properties & Characteristics", 4 pages, V&P Scientific; http://www.vp-scientific.com/parylene_properties.htm.

Thermospray Company, Inc., "Conformal Coating Frequently Asked Questions", date unknown, accessed Aug. 8, 2005 at http://www.thermospray.com/ccfaq.html.

Ultrasonic Systems, Inc., "Ultra-Spray—Ultrasonic Spray Technology", date unknown, accessed Aug. 8, 2005 at http://www.ultraspray.com/technology.aspx.

* cited by examiner

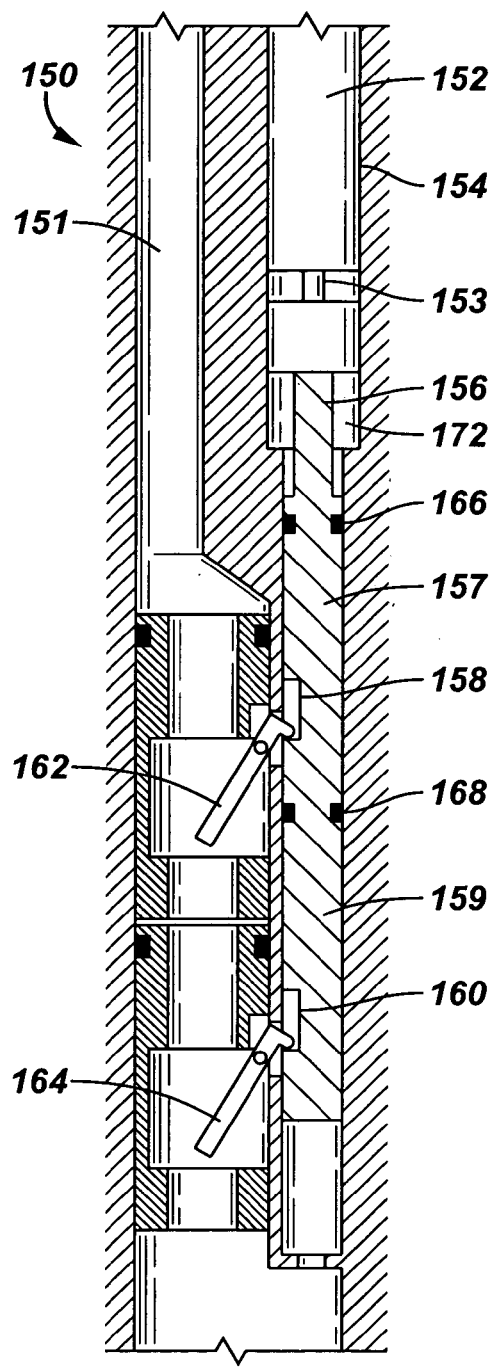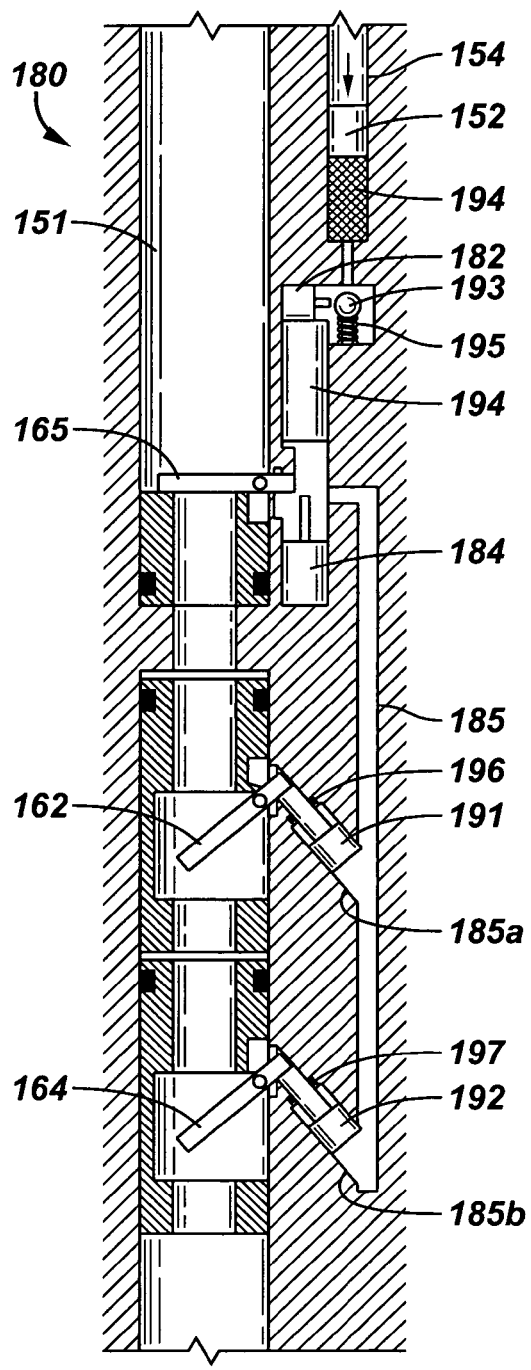

POLYMER PROTECTIVE COATED POLYMERIC COMPONENTS FOR OILFIELD APPLICATIONS

BACKGROUND OF THE INVENTION

1. Field of Invention

The present invention relates generally to the field of oilfield exploration, production, and testing), and more specifically to protection of polymeric components used in such ventures.

2. Related Art

Electrical submersible pumps (ESPs) are used for artificial lifting of fluid from a well or reservoir. An ESP typically comprises an electrical submersible motor, a seal section (sometimes referred to in the art as a protector) which functions to equalize the pressure between the inside of the system and the outside of the system and also acts as a reservoir for compensating the internal oil expansion from the motor; and a pump having one or more pump stages inside a housing. The protector may be formed of metal, as in a bellows device, or an elastomer, in which case the protector is sometimes referred to as a protector bag. Elastomers may also be used in packer elements, blow out preventer elements, O-rings, gaskets, electrical insulators and pressure sealing elements for fluids.

Common to all of these uses of elastomers is exposure to hostile chemical and mechanical subterranean environments that tend to unacceptably decrease the life and reliability of the elastomers.

Three basic approaches have been taken in addressing the pump protector problem. Replacing the elastomer with a thin metal membrane or bellows may be an expensive alternative that requires extensive redesign of the parts together with their mechanical attachment and interfaces. Improving the bulk properties of the elastomer material using additives is another alternative; however, that may require conflicting compromises in the mechanical, chemical, or reliability performance of the finished part. Typically, it is not feasible to find a combination of additives that satisfy all the requirements, or it is prohibitively expensive to either procure the additive materials or to manufacture the part. Applying some type of protective coating to elastomer seals has been tried in the medical, computer and electronics, defense, automotive, food processing and aerospace industries. Focus has been on various types and methods of applying either a metal or a polymer coating to protect elastomeric seals for either low friction, abrasion resistance or for chemically enhancing the wear resistance and environmental resistance of the part without changing the physical properties of the base elastomer. For example, U.S. Pat. No. 5,075,174 discusses Parylene-coated silicone elastomeric gaskets for use in the computer and electronics industry. There are two principal coating methods: Physical Vapor Deposition (PVD) and Chemical Vapor Decomposition (CVD). PVD coatings are typically made either by thermal evaporation or sputtering. Unfortunately, PVD is a line-of-sight coating process; therefore, coverage of the substrate is poor when a part is odd shaped or has cavities. In contrast, CVD is not restricted to line-of-sight; therefore it can coat all surfaces of the substrate. Examples of film coatings on elastomers include a silane polymer that was applied by plasma deposition in a radio frequency/microwave dual power source reactor (see U.S. Pat. No. 6,488,992), and a blend of elastomer and polyethylene co-extruded onto rubber weather stripping material (U.S. Pat. No. 5,110,685).

There remains a need in the natural resources exploration and production field for improving reliability and life of elastomeric and other polymeric components used in oilfield environments, such as protector bags, packer elements, pressure seals, valves, blow out preventer components, and the like.

SUMMARY OF THE INVENTION

In accordance with the present invention, apparatus and methods of making and using same are described that reduce or overcome problems in previously known apparatus and methods. By combining the properties of polymeric substrates with the properties of thin polymer coatings, the materials act together to increase reliability and life of oilfield elements that include the materials or are made from the materials.

A first aspect of the invention are apparatus comprising:
 (a) a polymeric substrate formed into an oilfield element;
 (b) a polymeric coating, which may be a conformal coating, adhered to at least a portion of the polymeric substrate.

The polymeric coating is a condensed phase formed by any one or more processes. The coating may be conformal (i.e., the coating conforms to the surfaces of the polymeric substrate), although this may not be necessary in all oilfield applications or all oilfield elements, or on all surfaces of the polymeric substrates. The coating may be formed from a vaporizable or depositable and polymerizable monomer, as well as particulate polymeric materials. The polymer in the coating is also generally responsible for adhering the coating to the polymeric substrate, although the invention does not rule out adhesion aids, which are further discussed herein. A major portion of the polymeric coating may comprise a carbon or heterochain chain polymer. Useful carbon chain polymers may be selected from polymers within formula —[R $(R^1_x)(R^2_y)]_n$—, wherein R is the repeating unit and may be selected from C, aryl, or —C($R^3_p$)($R^4_q$)-aryl-C($R^5_r$)($R^6_s$)—. If R=C, then $R^1$ and $R^2$ may be the same or different halogen atoms, x and y are integers each ranging from 0 to 4, x+y=4, and n ranges from 10 to 10,000. Examples include polytetrafluoroethylene and polychlorotrifluoroethylene. If R is aryl, the aryl is fused to at least one other aryl sharing two carbon atoms, $R^1$ and $R^2$ may be the same or different and may be on the same or different aryl moieties, $R^1$ and $R^2$ may be independently selected from any organic or inorganic group which can normally be substituted on aryl moieties, including, but not limited to alkyl, alkenyl, amino, cyano, carboxyl, alkoxy, hydroxy alkyl, carbalkoxy, hydroxyl, nitro, acyl, acylamino, or a halogen atom, x and y range from 0 up to the total number of available aryl substitution positions, and n is as defined above. Examples are polycyclic aromatic hydrocarbons such as polynaphthalene, polyanthracene, and polyphenanthrene. If R is —C($R^3_p$)($R^4_q$)-aryl-C($R^5_r$)($R^6_s$)—, $R^1$ and $R^2$ may be independently selected from any organic or inorganic group which can normally be substituted on aromatic nuclei, including, but not limited to alkyl, aryl, alkenyl, amino, cyano, carboxyl, alkoxy, hydroxy alkyl, carbalkoxy, hydroxyl, nitro or a halogen atom, x and y may be a number from 0 to 3 as long as x+y=3, n is a number from 10 to 10,000 or higher, $R^3$, $R^4$, $R^5$, and $R^6$ are independently selected from halogen atoms and hydrogen atoms, and p, q, r, and s may be 0, 1, or 2, with p+q=2 and r+s=2. Examples are Parylene N, wherein x=0, y=0, $R^3$, $R^4$, $R^5$, and $R^6$ are all hydrogen atoms, and p, q, r, and s are all equal to 1; Parylene C, wherein $R^1$ is a chlorine atom, x=1, y=0, $R^3$, $R^4$, $R^5$, and $R^6$ are all hydrogen atoms, and p, q, r, and s are all equal to 1; Parylene D, wherein $R^1$ is a chlorine atom, x=2, y=0, or $R^1$ and $R^2$ are both chlorine atoms and x=1 and y=1, $R^3$, $R^4$, $R^5$, and $R^6$ are all hydrogen atoms, and p, q, r, and s are all equal to 1; and Parylene Nova HT, wherein x=0, y=0, $R^3$, $R^4$, $R^5$, and $R^6$ are all fluorine atoms, and p, q, r, and s are all equal to 1.

One method of forming a polymeric coating on a polymeric substrate is by vaporizing or subliming a monomer or dimer into a pyrolysis chamber under mild vacuum, pyrolyzing the monomer or dimer under mild vacuum, and condensing the monomer or dimer onto the substrate where polymerization takes place. This is commonly referred to as vapor deposition polymerization (VDP). Depending on the polymeric coating composition, the polymeric coating may alternatively be formed by spraying monomers, oligomers, or pre-polymer solutions or small particles of the polymer onto the substrate. Fluidized bed coating may be used if the substrate is able to be heated to a high enough temperature to melt the fluidized polymer to be coated thereon without melting the polymeric substrate. In each deposition process, mechanical, chemical, or a combination of mechanical and chemical priming, for example using adhesion promoters and/or chemical coupling agents, may enhance adhesion of the polymer coating to the polymeric substrate formed into an oilfield element. The particular deposition methods are not considered a part of the present invention, but are presented for complete disclosure.

Apparatus of the invention may comprise polymeric substrates selected from natural and synthetic polymers, blends of natural and synthetic polymers, and layered versions of polymers, wherein individual layers may be the same or different in composition and thickness. The term "polymeric substrate" includes composite polymeric materials, such as, but not limited to, polymeric materials having fillers, plasticizers, and fibers therein. The polymeric substrate may comprise one or more thermoplastic polymers, one or more thermoset polymers, one or more elastomers, and combinations thereof.

Apparatus within the invention include those wherein the oilfield element may be selected from packer elements, submersible pump motor protector bags, sensor protectors, blow out preventer elements, sucker rods, O-rings, T-rings, gaskets, pump shaft seals, tube seals, valve seals, seals and insulators used in electrical components, such as power cable coverings, seals used in fiber optic connections, and pressure sealing elements for fluids (gas, liquid, or combinations thereof). Apparatus of the invention include apparatus wherein the oilfield element is a submersible pump motor protector, which may or may not be integral with the motor, and may include integral instrumentation adapted to measure one or more downhole parameters.

Another aspect of the invention are oilfield assemblies for exploring for, drilling for, or producing hydrocarbons, one oilfield assembly comprising:
(a) one or more oilfield elements; and
(b) one or more of the oilfield elements comprising a polymeric substrate having a polymeric coating thereon as in the first aspect of the invention.

Yet another aspect of the invention are methods of exploring for, drilling for, or producing hydrocarbons, one method comprising:
(a) selecting one or more oilfield elements having a component comprising a polymeric substrate having a polymeric coating thereon, the coating comprising a major portion of a polymer as described in the first aspect of the invention; and
(b) using the oilfield element in an oilfield operation, thus exposing the oilfield element to an oilfield environment.

Methods of the invention may include, but are not limited to, running one or more oilfield elements into a wellbore using one or more surface oilfield elements, and/or retrieving the oilfield element from the wellbore. The oilfield environment during running and retrieving may be the same or different from the oilfield environment during use in the wellbore or at the surface.

The various aspects of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which:

FIGS. 4A and 4B are schematic cross-sectional views of two reversing tools utilizing polymer-coated elastomeric components in accordance with the invention;

Figure 1:
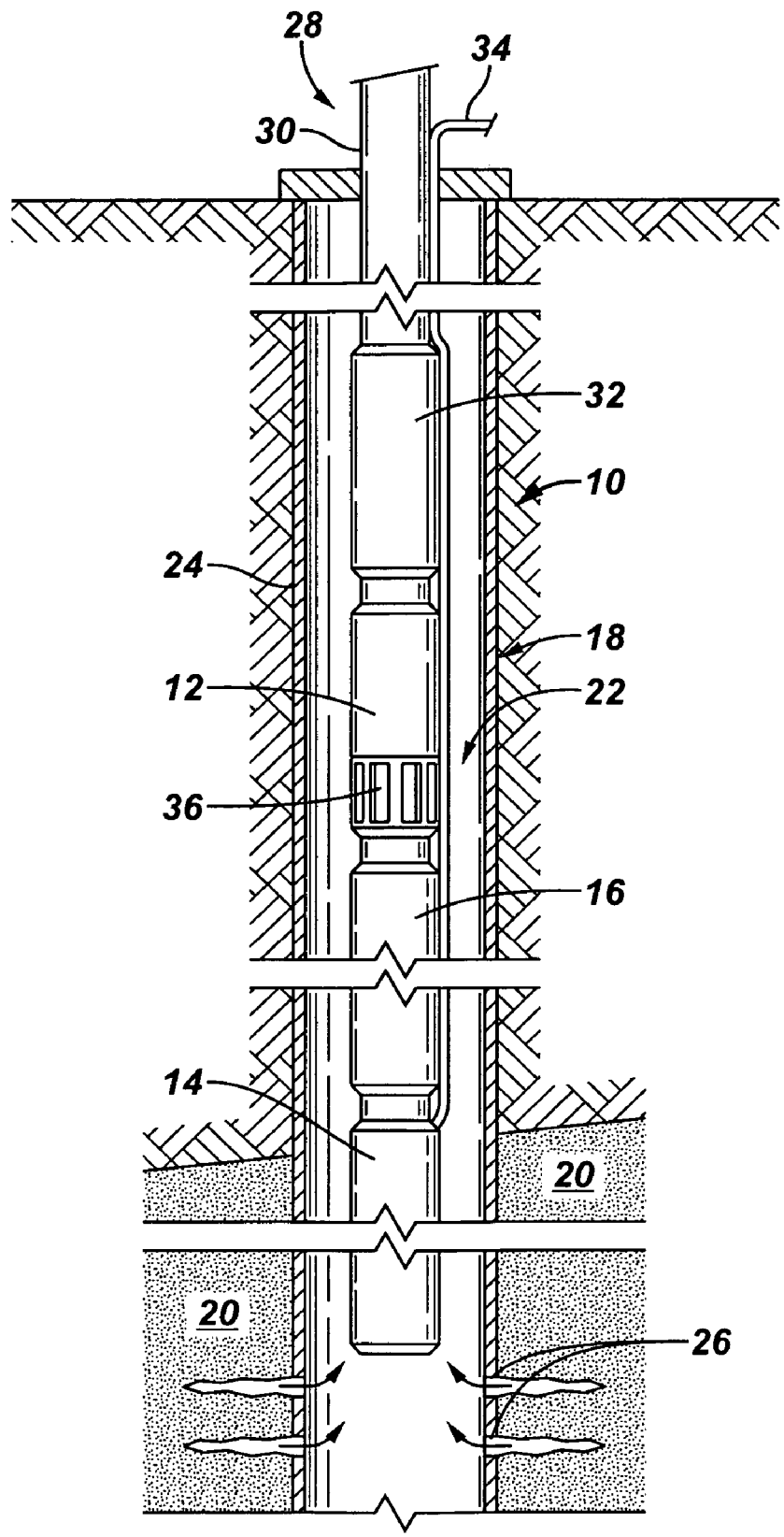
FIG. 1 is a front elevation view of an exemplary electrical submersible pump disposed within a wellbore.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The invention describes coated polymeric components useful in oilfield applications, including exploration, drilling, and production activities. As used herein the term "oilfield" includes land based (surface and sub-surface) and sub-seabed applications, and in certain instances seawater applications, such as when exploration, drilling, or production equipment is deployed through seawater. The term "oilfield" as used herein includes oil and gas reservoirs, and formations or portions of formations where oil and gas are expected but may ultimately only contain water, brine, or some other composition. A typical use of the coated polymeric components will be in downhole applications, such as pumping fluids from or into wellbores.

Polymeric Substrate Materials

Polymeric substrate materials useful in the invention may be selected from natural and synthetic polymers, blends of natural and synthetic polymers, and layered versions of polymers, wherein individual layers may be the same or different in composition and thickness. The term "polymeric substrate" includes composite polymeric materials, such as, but not limited to, polymeric materials having fillers, plasticizers, and fibers therein. The polymeric substrate may comprise one or more thermoplastic polymers, one or more thermoset and/or thermally cured polymers, one or more elastomers, composite materials, and combinations thereof.

One class of useful polymeric substrates are the elastomers. "Elastomer" as used herein is a generic term for substances emulating natural rubber in that they stretch under tension, have a high tensile strength, retract rapidly, and substantially recover their original dimensions. The term includes natural and man-made elastomers, and the elastomer may be a thermoplastic elastomer or a non-thermoplastic elastomer. The term includes blends (physical mixtures) of elastomers, as well as copolymers, terpolymers, and multipolymers. Useful elastomers may also include one or more additives, fillers, plasticizers, and the like.

Suitable examples of useable fluoroelastomers are copolymers of vinylidene fluoride and hexafluoropropylene and terpolymers of vinylidene fluoride, hexafluoropropylene and tetrafluoroethylene. The fluoroelastomers suitable for use in the disclosed invention are elastomers that comprise one or more vinylidene fluoride units ($VF_2$ or VdF), one or more hexafluoropropylene units (HFP), one or more tetrafluoroethylene units (TFE), one or more chlorotrifluoroethylene (CTFE) units, and/or one or more perfluoro(alkyl vinyl ether) units (PAVE) such as perfluoro(methyl vinyl ether)(PMVE), perfluoro(ethyl vinyl ether)(PEVE), and perfluoro(propyl vinyl ether)(PPVE). These elastomers can be homopolymers or copolymers. Particularly suitable are fluoroelastomers containing vinylidene fluoride units, hexafluoropropylene units, and, optionally, tetrafluoroethylene units and fluoroelastomers containing vinylidene fluoride units, perfluoroalkyl perfluorovinyl ether units, and tetrafluoroethylene units, such as the vinylidene fluoride type fluoroelastomer known under the trade designation Aflas®, available from Asahi Glass Co., Ltd. Especially suitable are copolymers of vinylidene fluoride and hexafluoropropylene units. If the fluoropolymers contain vinylidene fluoride units, preferably the polymers contain up to 40 mole % $VF_2$ units, e.g., 30-40 mole %. If the fluoropolymers contain hexafluoropropylene units, preferably the polymers contain up to 70 mole % HFP units. If the fluoropolymers contain tetrafluoroethylene units, preferably the polymers contain up to 10 mole % TFE units. When the fluoropolymers contain chlorotrifluoroethylene preferably the polymers contain up to 10 mole % CTFE units. When the fluoropolymers contain perfluoro(methyl vinyl ether) units, preferably the polymers contain up to 5 mole % PMVE units. When the fluoropolymers contain perfluoro (ethyl vinyl ether) units, preferably the polymers contain up to 5 mole % PEVE units. When the fluoropolymers contain perfluoro(propyl vinyl ether) units, preferably the polymers contain up to 5 mole % PPVE units. The fluoropolymers preferably contain 66%-70% fluorine. One suitable commercially available fluoroelastomer is that known under the trade designation Technoflon FOR HS® sold by Ausimont USA. This material contains Bisphenol AF, manufactured by Halocarbon Products Corp. Another commercially available fluoroelastomer is known under the trade designation Viton® AL 200, by DuPont Dow, which is a terpolymer of $VF_2$, HFP, and TFE monomers containing 67% fluorine. Another suitable commercially available fluoroelastomer is Viton® AL 300, by DuPont Dow. A blend of the terpolymers known under the trade designations Viton® AL 300 and Viton® AL 600 can also be used (e.g., one-third AL-600 and two-thirds AL-300). Other useful elastomers include products known under the trade designations 7182B and 7182D from Seals Eastern, Red Bank, N.J.; the product known under the trade designation FL80-4 available from Oil States Industries, Inc., Arlington, Tex.; and the product known under the trade designation DMS005 available from Duromould, Ltd., Londonderry, Northern Ireland.

Thermoplastic elastomers are generally the reaction product of a low equivalent molecular weight polyfunctional monomer and a high equivalent molecular weight polyfunctional monomer, wherein the low equivalent weight polyfunctional monomer is capable, on polymerization, of forming a hard segment (and, in conjunction with other hard segments, crystalline hard regions or domains) and the high equivalent weight polyfunctional monomer is capable, on polymerization, of producing soft, flexible chains connecting the hard regions or domains.

"Thermoplastic elastomers" differ from "thermoplastics" and "elastomers" in that thermoplastic elastomers, upon heating above the melting temperature of the hard regions, form a homogeneous melt which can be processed by thermoplastic techniques (unlike elastomers), such as injection molding, extrusion, blow molding, and the like. Subsequent cooling leads again to segregation of hard and soft regions resulting in a material having elastomeric properties, however, which does not occur with thermoplastics. Commercially available thermoplastic elastomers include segmented polyester thermoplastic elastomers, segmented polyurethane thermoplastic elastomers, segmented polyamide thermoplastic elastomers, blends of thermoplastic elastomers and thermoplastic polymers, and ionomeric thermoplastic elastomers.

"Segmented thermoplastic elastomer", as used herein, refers to the sub-class of thermoplastic elastomers which are based on polymers which are the reaction product of a high equivalent weight polyfunctional monomer and a low equivalent weight polyfunctional monomer.

"Ionomeric thermoplastic elastomers" refers to a sub-class of thermoplastic elastomers based on ionic polymers (ionomers). Ionomeric thermoplastic elastomers are composed of two or more flexible polymeric chains bound together at a plurality of positions by ionic associations or clusters. The ionomers are typically prepared by copolymerization of a functionalized monomer with an olefinic unsaturated monomer, or direct functionalization of a preformed polymer. Carboxyl-functionalized ionomers are obtained by direct copolymerization of acrylic or methacrylic acid with ethylene, styrene and similar comonomers by free-radical copolymerization. The resulting copolymer is generally available as the free acid, which can be neutralized to the degree desired with metal hydroxides, metal acetates, and similar salts.

Another useful class of polymeric substrate materials are thermoplastic materials. A thermoplastic material is defined as a polymeric material (preferably, an organic polymeric material) that softens and melts when exposed to elevated temperatures and generally returns to its original condition, i.e., its original physical state, when cooled to ambient temperatures. During the manufacturing process of an oilfield element, the thermoplastic material may be heated above its softening temperature, and preferably above its melting temperature, to cause it to flow and form the desired shape of the oilfield element. After the desired shape is formed, the thermoplastic substrate is cooled and solidified. In this way, thermoplastic materials (including thermoplastic elastomers) can be molded into various shapes and sizes.

Thermoplastic materials may be preferred over other types of polymeric materials at least because the product has advantageous properties, and the manufacturing process for the preparation of oilfield elements may be more efficient. For example, an oilfield element formed from a thermoplastic material is generally less brittle and less hygroscopic than an element formed from a thermosetting material. Furthermore, as compared to a process that would use a thermosetting resin, a process that uses a thermoplastic material may require fewer processing steps, fewer organic solvents, and fewer materials, e.g., catalysts. Also, with a thermoplastic material, standard molding techniques such as injection molding can be used. This can reduce the amount of materials wasted in construction.

Moldable thermoplastic materials that may be used are those having a high melting temperature, good heat resistant properties, and good toughness properties such that the oilfield element or assemblies containing these materials operably withstand oilfield conditions without substantially deforming or disintegrating. The toughness of the thermoplastic material can be measured by impact strength, such as Gardner Impact value.

Thermoplastic polymeric substrates useful in the invention are those able to withstand expected temperatures, temperature changes, and temperature differentials (for example a temperature differential from one surface of a gasket to the other surface material to the other surface) during use, as well as expected pressures, pressure changes, and pressure differentials during use, with a safety margin on temperature and pressure appropriate for each application. Additionally, the melting temperature of the thermoplastic material should be sufficiently lower, i.e., at least about 25° C. lower, than the melting temperature of any fibrous reinforcing material, and sufficiently higher than the melting temperature of any thermoplastic coating materials to be applied by fluidized bed dip coating. In this way, reinforcing material (if used) is not adversely affected during the molding of the thermoplastic substrate, and the substrate will not melt if a thermoplastic coating is applied by dip coating. Furthermore, the thermoplastic substrate material, if used, should be sufficiently compatible with the material used in the polymeric coating such that the substrate does not deteriorate, and such that there is effective adherence of the coating to the substrate.

Examples of thermoplastic materials suitable for substrates in oilfield elements according to the present invention include polycarbonates, polyetherimides, polyesters, polysulfones, polystyrenes, acrylonitrile-butadiene-styrene block copolymers, acetal polymers, polyamides, or combinations thereof. Of this list, polyamides and polyesters may provide better performance. Polyamide materials are useful at least because they are inherently tough and heat resistant, typically provide good adhesion to coatings without priming, and are relatively inexpensive. Polyamide resin materials may be characterized by having an amide group, i.e., —C(O)NH—. Various types of polyamide resin materials, i.e., nylons, can be used, such as nylon 6/6 or nylon 6. Of these, nylon 6 may be used if a phenolic-based coating is used because of the excellent adhesion between nylon 6 and phenolic-based coatings. Nylon 6/6 is a condensation product of adipic acid and hexamethylenediamine. Nylon 6/6 has a melting point of about 264° C. and a tensile strength of about 770 kg/cm$^2$. Nylon 6 is a polymer of c-caprolactam. Nylon 6 has a melting point of about 223° C. and a tensile strength of about 700 kg/cm$^2$. Examples of commercially available nylon resins useable as substrates in oilfield elements according to the present invention include those known under the trade designations "Vydyne" from Solutia, St. Louis, Mo.; "Zytel" and "Minlon" both from DuPont, Wilmington, Del.; "Trogamid T" from Degussa Corporation, Parsippany, N.J.; "Capron" from BASF, Florham Park, N.J.; "Nydur"from Mobay, Inc., Pittsburgh, Pa.; and "Ultramid" from BASF Corp., Parsippany, N.J. Mineral-filled thermoplastic materials can be used, such as the mineral-filled nylon 6 resin "Minlon", from DuPont.

Suitable thermoset (thermally cured) polymers for use as polymeric substrates in the present invention include those discussed in relation to polymeric coatings, which discussion follows, although the precursor solutions need not be coatable, and may therefore omit certain ingredients, such as diluents. Thermoset molding compositions known in the art are generally thermosetting resins containing inorganic fillers and/or fibers. Upon heating, thermoset monomers initially exhibit viscosities low enough to allow for melt processing and molding of an article from the filled monomer composition. Upon further heating, the thermosetting monomers react and cure to form hard resins with high stiffness. Thermoset polymeric substrates useful in the invention may be manufactured by any method known in the art. These methods include, but are not limited to, reaction injection molding, resin transfer molding, and other processes wherein dry fiber reinforcement plys (preforms) are loaded in a mold cavity whose surfaces define the ultimate configuration of the article to be fabricated, whereupon a flowable resin is injected, or vacuumed, under pressure into the mold cavity (mold plenum) thereby to produce the article, or to saturate/wet the fiber reinforcement preforms, where provided. After the resinated preforms are cured in the mold plenum, the finished article is removed from the mold. As one non-limiting example of a useable thermosettable polymer precursor composition, U.S. Pat. No. 6,878,782 discloses a curable composition including a functionalized poly(arylene ether); an alkenyl aromatic monomer; an acryloyl monomer; and a polymeric additive having a glass transition temperature less than or equal to 100° C., and a Young's modulus less than or equal to 1000 megapascals at 25° C. The polymeric additive is soluble in the combined functionalized poly(arylene ether), alkenyl aromatic monomer, and acryloyl monomer at a temperature less than or equal to 50° C. The composition exhibits low shrinkage on curing and improved surface smoothness. It is useful, for example, in the manufacture of sucker rods.

Polymeric Coatings

"Coating" as used herein as a noun, means a condensed phase formed by any one or more processes. The coating may be conformal (i.e., the coating conforms to the surfaces of the polymeric substrate), although this may not be necessary in all oilfield applications or all oilfield elements, or on all surfaces of the polymeric substrates. Conformal coatings based on urethane, acrylic, silicone, and epoxy chemistries are known, primarily in the electronics and computer industries (printed circuit boards, for example). Another useful conformal coating includes those formed by vaporization or sublimation of, and subsequent pyrolization and condensation of monomers or dimers and polymerized to form a continuous polymer film, such as the class of polymeric coatings based on poly (p-xylylene), commonly known as Parylene. For example, Parylene N coatings may be formed by vaporization or sublimation of a dimer within formula (I), and subsequent pyrolization and condensation of the divalent radicals within formula (II) to form a polymer within formula (III), although the vaporization is not strictly necessary. In formulas (I), (II), and (III), x and y are both equal to 0 to for a Parylene N coating. Other Parylene coatings may be formed in similar fashion.

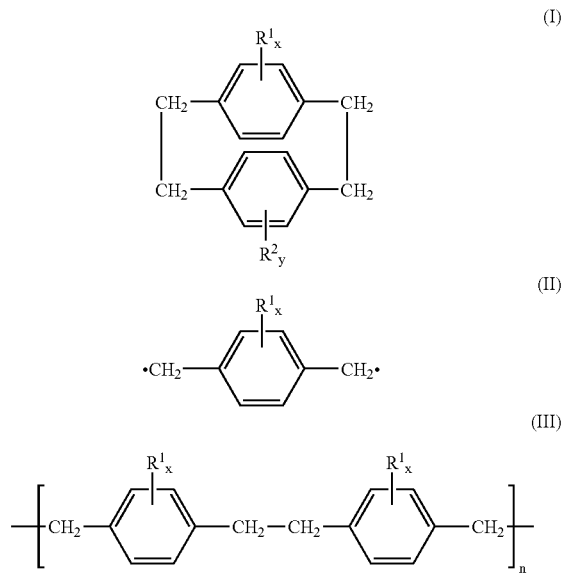

Another class of useful polymeric coatings are thermally curable coatings derived from coatable, thermally curable coating precursor solutions, such a those described in U.S. Pat. No. 5,178,646, incorporated by reference herein. Coatable, thermally curable coating precursor solutions may comprise a 30-95% solids solution, or 60-80% solids solution of a thermally curable resin having a plurality of pendant methylol groups, the balance of the solution comprising water and a reactive diluent. The term "coatable", as used herein, means that the solutions of the invention may be coated or sprayed onto polymeric substrates using coating devices which are conventional in the spray coating art, such as knife coaters, roll coaters, flow-bar coaters, electrospray coaters, ultrasonic coaters, gas-atomizing spray coaters, and the like. This characteristic may also be expressed in terms of viscosity of the solutions. The viscosity of the coatable, thermally curable coating precursor solutions generally should not exceed about 2000 centipoise, measured using a Brookfield viscometer, number 2 spindle, 60 rpm, at 25° C. The term "percent solids" means the weight percent organic material that would remain upon application of curing conditions. Percent solids below about 30% are not practical to use because of VOC emissions, while above about 95% solids the resin solutions are difficult to render coatable, even when heated.

The term "diluent" is used in the sense that the reactive diluent dilutes the concentration of thermally curable resin in the solution, and does not mean that the solutions necessarily decrease in viscosity. The thermally curable resin may be the reaction product of a non-aldehyde and an aldehyde, the non-aldehyde selected from ureas and phenolics. The reactive diluent has at least one functional group which is independently reactive with the pendant methylol groups and with the aldehyde, and may be selected from A) compounds selected from the group consisting of compounds represented by the general formula $R^7R^8N(C=X)Y$ and mixtures thereof wherein X=O or S and Y=—$NR^9R^{10}$ or —$OR^{11}$, such that when X=S, Y=$NR^9R^{10}$, each of $R^7, R^8, R^9, R^{10}$ and $R^{11}$ is a monovalent radical selected from hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and which may include the provisos that:
   (i) the compound contains at least one —NH and one —OH group or at least two —OH groups or at least two —NH groups;
   (ii) $R^7$ and $R^8$ or $R^7$ and $R^9$ can be linked to form a ring structure; and
   (iii) $R^7, R^8, R^9, R^{10}$ and $R^{11}$ are never all hydrogen at the same time;

B) compounds having molecular weight less than about 300 and selected from the group consisting of alkylsubstituted 2-aminoalcohols, β-ketoalkylamides, and nitro alkanes;

C) poly(oxyalkylene) amines having molecular weight ranging from about 90 to about 1000; and D) poly(oxyalkylene) ureido compounds having molecular weight ranging from about 90 to about 1000.

Reactive diluents useful in the compositions include those wherein X is O, Y=$NR^9R^{10}$, $R^7$ is 2-hydroxyethyl, $R^8$ and $R^9$ are linked to form an ethylene bridge, and $R^{10}$ is hydrogen.

One alkylsubstituted 2-aminoalcohol useful as a reactive diluent is 2-amino-2-methyl-1-propanol, while the β-ketoalkylamide may be β-ketobutyramide. Additionally, nitroalkanes with at least 1 active hydrogen atom attached to the alpha carbon atom will scavenge formaldehyde in coatable thermally curable polymer precursor solutions useful in the invention. Representative poly(oxyalkylene) amines include poly(oxyethylene-co-oxypropylene) amine, poly(oxypropylene) amine, and poly(oxypropylene) diamine, whereas representative poly(oxyalkylene) ureido compounds are the reaction product of urea and the poly(oxyalkylene) amines previously enumerated. Optionally, useful coatable, thermally curable polymeric coating precursor solutions may include up to about 50 weight percent (of the total weight of thermally curable resin) of ethylenically unsaturated monomers. These monomers, such as tri- and tetra-ethylene glycol diacrylate, are radiation curable and can reduce the overall cure time of the thermally curable resins by providing a mechanism for pre-cure gelation of the thermally curable resin.

Two other classes of useful coatings are condensation curable and addition polymerizable resins, wherein the addition polymerizable resins are derived from a polymer precursor which polymerizes upon exposure to a non-thermal energy source which aids in the initiation of the polymerization or curing process. Examples of non-thermal energy sources include electron beam, ultraviolet light, visible light, and other non-thermal radiation. During this polymerization process, the resin is polymerized and the polymer precursor is converted into a solidified polymeric coating. Upon solidification of the polymer precursor, the coating is formed. The polymer in the coating is also generally responsible for adhering the coating to the polymeric substrate, however the invention is not so limited. Addition polymerizable resins are readily cured by exposure to radiation energy. Addition polymerizable resins can polymerize through a cationic mechanism or a free radical mechanism. Depending upon the energy source that is utilized and the polymer precursor chemistry, a curing agent, initiator, or catalyst may be used to help initiate the polymerization.

Examples of useful organic resins to form these classes of polymeric coating include the before-mentioned methylol-containing resins such as phenolic resins, urea-formaldehyde resins, and melamine formaldehyde resins; acrylated urethanes; acrylated epoxies; ethylenically unsaturated compounds; aminoplast derivatives having pendant unsaturated carbonyl groups; isocyanurate derivatives having at least one pendant acrylate group; isocyanate derivatives having at least one pendant acrylate group; vinyl ethers; epoxy resins; and mixtures and combinations thereof. The term "acrylate" encompasses acrylates and methacrylates.

Phenolic resins are widely used in industry because of their thermal properties, availability, and cost. There are two types of phenolic resins, resole and novolac. Resole phenolic resins have a molar ratio of formaldehyde to phenol of greater than or equal to one to one, typically between 1.5:1.0 to 3.0:1.0. Novolac resins have a molar ratio of formaldehyde to phenol of less than one to one. Examples of commercially available phenolic resins include those known by the tradenames. "Durez" and "Varcum" from Durez Corporation, a subsidiary of Sumitomo Bakelite Co., Ltd.; "Resinox" from Monsanto; "Aerofene" from Ashland Chemical Co. and "Aerotap" from Ashland Chemical Co.

Acrylated urethanes are diacrylate esters of hydroxy-terminated, isocyanate (NCO) extended polyesters or polyethers. Examples of commercially available acrylated urethanes include those known under the trade designations "UVITHANE 782", available from Morton Thiokol Chemical, and "CMD 6600", "CMD 8400", and "CMD 8805", available from Radcure Specialties.

Acrylated epoxies are diacrylate esters of epoxy resins, such as the diacrylate esters of Bisphenol A epoxy resin. Examples of commercially available acrylated epoxies include those known under the trade designations "CMD 3500", "CMD 3600", and "CMD 3700", available from Radcure Specialties.

Ethylenically unsaturated resins include both monomeric and polymeric compounds that contain atoms of carbon, hydrogen, and oxygen, and optionally, nitrogen and the halogens. Oxygen or nitrogen atoms or both are generally present in ether, ester, urethane, amide, and urea groups. Ethylenically unsaturated compounds may have a molecular weight of less than about 4,000 and may be esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like. Representative examples of acrylate resins include methyl methacrylate, ethyl methacrylate styrene, divinylbenzene, vinyl toluene, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, pentaerythritol tetraacrylate and pentaerythritol tetraacrylate. Other ethylenically unsaturated resins include monoallyl, polyallyl, and polymethallyl esters and amides of carboxylic acids, such as diallyl phthalate, diallyl adipate, and N,N-diallyladipamide. Still other nitrogen containing compounds include tris(2-acryloyloxyethyl)isocyanurate, 1,3,5-tri(2-methyacryloxyethyl)-triazine, acrylamide, methylacrylamide, N-methylacrylamide, N,N-dimethylacrylamide, N-vinylpyrrolidone, and N-vinylpiperidone.

The aminoplast resins have at least one pendant α,β-unsaturated carbonyl group per molecule or oligomer. These unsaturated carbonyl groups can be acrylate, methacrylate, or acrylamide type groups. Examples of such materials include N-(hydroxymethyl) acrylamide, N,N'-oxydimethylenebisacrylamide, ortho- and para-acrylamidomethylated phenol, acrylamidomethylated phenolic novolac, and combinations thereof. These materials are further described in U.S. Pat. Nos. 4,903,440 and 5,236,472 both incorporated herein by reference.

Isocyanurate derivatives having at least one pendant acrylate group and isocyanate derivatives having at least one pendant acrylate group are further described in U.S. Pat. No. 4,652,274 incorporated herein after by reference. The isocyanurate material may be a triacrylate of tris(hydroxy ethyl) isocyanurate.

Epoxy resins have an oxirane and are polymerized by the ring opening. Such epoxide resins include monomeric epoxy resins and oligomeric epoxy resins. Examples of some useful epoxy resins include 2,2-bis[4-(2,3-epoxypropoxy)-phenyl propane] (diglycidyl ether of Bisphenol) and commercially available materials under the trade designations "Epon 828", "Epon 1004", and "Epon 1001F" available from Shell Chemical Co., Houston, Tex., "DER-331", "DER-332", and "DER-334" available from Dow Chemical Co., Freeport, Tex. Other suitable epoxy resins include glycidyl ethers of phenol formaldehyde novolac (e.g., "DEN-431" and "DEN-428" available from Dow Chemical Co.).

Epoxy resins useful in the invention can polymerize via a cationic mechanism with the addition of an appropriate cationic curing agent. Cationic curing agents generate an acid source to initiate the polymerization of an epoxy resin. These cationic curing agents can include a salt having an onium cation and a halogen containing a complex anion of a metal or metalloid. Other cationic curing agents include a salt having an organometallic complex cation and a halogen containing complex anion of a metal or metalloid which are further described in U.S. Pat. No. 4,751,138 incorporated here in after by reference (column 6, line 65 to column 9, line 45). Another example is an organometallic salt and an onium salt is described in U.S. Pat. No. 4,985,340 (column 4, line 65 to column 14, line 50); and European Patent Application Nos. 306,161 and 306,162, both published Mar. 8, 1989, all incorporated by reference. Still other cationic curing agents include an ionic salt of an organometallic complex in which the metal is selected from the elements of Periodic Group IVB, VB, VIB, VIIB and VIIIB which is described in European Patent Application No. 109,581, published Nov. 21, 1983, incorporated by reference.

Regarding free radical curable resins, in some embodiments the polymeric precursor solution may further comprise a free radical curing agent. However in the case of an electron beam energy source, the curing agent is not always required because the electron beam itself generates free radicals. Examples of free radical thermal initiators include peroxides, e.g., benzoyl peroxide, azo compounds, benzophenones, and quinones. For either ultraviolet or visible light energy source, this curing agent is sometimes referred to as a photoinitiator. Examples of initiators, that when exposed to ultraviolet light generate a free radical source, include but are not limited to those selected from organic peroxides, azo compounds, quinones, benzophenones, nitroso compounds, acryl halides, hydrozones, mercapto compounds, pyrylium compounds, triacrylimdazoles, bisimidazoles, chloroalkytriazines, benzoin ethers, benzil ketals, thioxanthones, and acetophenone derivatives, and mixtures thereof. Examples of initiators that when exposed to visible radiation generate a free radical source can be found in U.S. Pat. No. 4,735,632, incorporated herein by reference. The initiator for use with visible light may be that known under the trade designation "Irgacure 369" commercially available from Ciba Specialty Chemicals, Tarrytown, N.Y.

Adhesion Promoters, Coupling Agents and Other Optional Ingredients

For embodiments wherein a better bond between the polymeric coating and the polymeric substrate is desired, mechanical and/or chemical adhesion promotion (priming) techniques may used. For example, if the polymeric substrate is a thermoplastic polycarbonate, polyetherimide, polyester, polysulfone, or polystyrene material, use of a primer may be preferred to enhance the adhesion between the substrate and the coating. The term "primer" as used in this context is meant to include both mechanical and chemical type primers or priming processes. Examples of mechanical priming processes include, but are not limited to, corona treatment and scuffing, both of which increase the surface area of the backing. An example of a preferred chemical primer is a colloidal dispersion of, for example, polyurethane, acetone, isopropanol, water, and a colloidal oxide of silicon, as taught by U.S. Pat. No. 4,906,523, which is incorporated herein by reference.

Besides the polymeric material, the substrate of the invention may include an effective amount of a fibrous reinforcing material. Herein, an "effective amount" of a fibrous reinforcing material is a sufficient amount to impart at least improvement in the physical characteristics of the substrate, i.e., heat resistance, toughness, flexibility, stiffness, shape control, adhesion, etc., but not so much fibrous reinforcing material as to give rise to any significant number of voids and detrimentally affect the structural integrity of the substrate. The amount of the fibrous reinforcing material in the substrate may be within a range of about 1-40%, or within a range of about 5-35%, or within a range of about 15-30%, based upon the weight of the backing.

The fibrous reinforcing material may be in the form of individual fibers or fibrous strands, or in the form of a fiber mat or web. The mat or web can be either in a woven or nonwoven matrix form. Examples of useful reinforcing fibers in applications of the present invention include metallic fibers or nonmetallic fibers. The nonmetallic fibers include glass fibers, carbon fibers, mineral fibers, synthetic or natural fibers formed of heat resistant organic materials, or fibers made from ceramic materials.

By "heat resistant" organic fibers, it is meant that useable organic fibers must be resistant to melting, or otherwise breaking down, under the conditions of manufacture and use of the coated substrates of the present invention. Examples of useful natural organic fibers include wool, silk, cotton, or cellulose. Examples of useful synthetic organic fibers include polyvinyl alcohol fibers, polyester fibers, rayon fibers, polyamide fibers, acrylic fibers, aramid fibers, or phenolic fibers. Generally, any ceramic fiber is useful in applications of the present invention. An example of a ceramic fiber suitable for the present invention is "Nextel" which is commercially available from 3M Co., St. Paul, Minn. Glass fibers may be used, at least because they impart desirable characteristics to the coated abrasive articles and are relatively inexpensive. Furthermore, suitable interfacial binding agents exist to enhance adhesion of glass fibers to thermoplastic materials. Glass fibers are typically classified using a letter grade. For example, E glass (for electrical) and S glass (for strength). Letter codes also designate diameter ranges, for example, size "D" represents a filament of diameter of about 6 micrometers and size "G" represents a filament of diameter of about 10 micrometers. Useful grades of glass fibers include both E glass and S glass of filament designations D through U. Preferred grades of glass fibers include E glass of filament designation "G" and S glass of filament designation "G." Commercially available glass fibers are available from Specialty Glass Inc., Oldsmar, Fla.; Owens-Corning Fiberglass Corp., Toledo, Ohio; and Mo-Sci Corporation, Rolla, Mo. If glass fibers are used, the glass fibers may be accompanied by an interfacial binding agent, i.e., a coupling agent, such as a silane coupling agent, to improve the adhesion to the thermoplastic material. Examples of silane coupling agents include "Z-6020" and "Z-6040," available from Dow Coming Corp., Midland, Mich.

The substrates of the present invention may further include an effective amount of a toughening agent. This will be preferred for certain applications. A primary purpose of the toughening agent is to increase the impact strength of the substrate. By "an effective amount of a toughening agent" it is meant that the toughening agent is present in an amount to impart at least improvement in the substrate toughness without it becoming too flexible. The substrates of the present invention preferably include sufficient toughening agent to achieve the desirable impact test values listed above. A substrate of the present invention may contain between about 1% and about 30% of the toughening agent, based upon the total weight of the substrate. For example, the less elastomeric characteristics a toughening agent possesses, the larger quantity of the toughening agent may be required to impart desirable properties to the substrates of the present invention. Toughening agents that impart desirable stiffness characteristics to the backing of the present invention include rubber-type polymers and plasticizers. Of these, the rubber toughening agents may be mentioned, and synthetic elastomers. Examples of preferred toughening agents, i.e., rubber tougheners and plasticizers, include: toluenesulfonamide derivatives (such as a mixture of N-butyl- and N-ethyl-p-toluenesulfonamide, commercially available from Akzo Chemicals, Chicago, Ill., under the trade designation "Ketjenflex 8"); styrene butadiene copolymers; polyether backbone polyamides (commercially available from Atochem, Glen Rock, N.J., under the trade designation "Pebax"); rubber-polyamide copolymers (commercially available from DuPont, Wilmington, Del., under the trade designation "Zytel FN"); and functionalized triblock polymers of styrene-(ethylene butylene)-styrene (commercially available from Shell Chemical Co., Houston, Tex., under the trade designation "Kraton FG1901"); and mixtures of these materials. Of this group, rubber-polyamide copolymers and styrene-(ethylene butylene)-styrene triblock polymers may be used, at least because of the beneficial characteristics they impart to substrates. Rubber-polyamide copolymers may also be used, at least because of the beneficial impact characteristics they impart to the substrates of the present invention. If the backing is made by injection molding, typically the toughener is added as a dry blend of toughener pellets with the other components. The process usually involves tumble-blending pellets of toughener with pellets of fiber-containing thermoplastic material. A more preferred method involves compounding the thermoplastic material, reinforcing fibers, and toughener together in a suitable extruder, pelletizing this blend, then feeding these prepared pellets into the injection molding machine. Commercial compositions of toughener and thermoplastic material are available, for example, under the designation "Ultramid" from BASF Corp., Parsippany, N.J. Specifically, "Ultramid B3ZG6" is a nylon resin containing a toughening agent and glass fibers that is useful in the present invention.

Optional Substrate Additives

Besides the materials described above, polymeric substrates useful in the invention may include effective amounts of other materials or components depending upon the end properties desired. For example, the substrate may include a shape stabilizer, i.e., a thermoplastic polymer with a melting point higher than that described above for the thermoplastic material. Suitable shape stabilizers include, but are not limited to, poly(phenylene sulfide), polyimides, and polyaramids. An example of a preferred shape stabilizer is polyphenylene oxide nylon blend commercially available from GE Plastics, Pittsfield, Mass., under the trade designation "Noryl GTX 910." If a phenolic-based coating is employed, however, the polyphenylene oxide nylon blend may not be preferred because of possible nonuniform interaction between the phenolic resin coating and the nylon, resulting in reversal of the shape-stabilizing effect. This nonuniform interaction results from a difficulty in obtaining uniform blends of the polyphenylene oxide and the nylon.

Other such materials that may be added to the substrate for certain applications of the present invention include inorganic or organic fillers. Inorganic fillers are also known as mineral fillers. A filler is defined as a particulate material, typically having a particle size less than about 100 micrometers, preferably less than about 50 micrometers. Examples of useful fillers for applications of the present invention include carbon black, calcium carbonate, silica, calcium metasilicate, cryolite, phenolic fillers, or polyvinyl alcohol fillers. If a filler is used, it is theorized that the filler fills in between the reinforcing fibers and may prevent crack propagation through the substrate. Typically, a filler would not be used in an amount greater than about 20%, based on the weight of the substrate. Preferably, at least an effective amount of filler is used. Herein, the term "effective amount" in this context refers to an amount sufficient to fill but not significantly reduce the tensile strength of the hardened substrate.

Other useful materials or components that can be added to the substrate for certain applications of the present invention include, but are not limited to, oils, antistatic agents, flame retardants, heat stabilizers, ultraviolet stabilizers, internal lubricants, antioxidants, and processing aids. One would not typically use more of these components than needed for desired results.

The apparatus, in particular the polymeric substrates, if filled with fillers, may also contain coupling agents. When an organic polymeric matrix has an inorganic filler, a coupling agent may be desired. Coupling agents may operate through two different reactive functionalities: an organofunctional moiety and an inorganic functional moiety. When a resin/filler mixture is modified with a coupling agent, the organofunctional group of the coupling agent becomes bonded to or otherwise attracted to or associated with the uncured resin. The inorganic functional moiety appears to generate a similar association with the dispersed inorganic filler. Thus, the coupling agent acts as a bridge between the organic resin and the inorganic filler at the resin/filler interface. In various systems this results in:

1. Reduced viscosity of the resin/filler dispersion. Such a dispersion, during a process of preparing a coated substrate, generally facilitates application.
2. Enhanced suspendability of the filler in the resin, i.e., decreasing the likelihood that suspended or dispersed filler will settle out from the resin/filler suspension during storing or processing to manufacture oilfield elements.
3. Improved product performance due to enhanced operation lifetime, for example through increased water resistance or general overall observed increase in strength and integrity of the bonding system.

Herein, the term "coupling agent" includes mixtures of coupling agents. An example of a coupling agent that may be found suitable for this invention is gamma-methacryloxypropyltrimethoxy silane known under the trade designation "Silquest A-174" from GE Silicones, Wilton, Conn. Other suitable coupling agents are zircoaluminates, and titanates.

Oilfield Elements, Assemblies, and Wellbores

An "oilfield assembly", as used herein, is the complete set or suite of oilfield elements that may be used in a particular job. All oilfield elements in an oilfield assembly may or may not be interconnected, and some may be interchangeable.

An "oilfield element" includes, but is not limited to one or more items or assemblies selected from tubing, blow out preventers, sucker rods, O-rings, T-rings, jointed pipe, electric submersible pumps, packers, centralizers, hangers, plugs, plug catchers, check valves, universal valves, spotting valves, differential valves, circulation valves, equalizing valves, safety valves, fluid flow control valves, connectors, disconnect tools, downhole filters, motorheads, retrieval and fishing tools, bottom hole assemblies, seal assemblies, snap latch assemblies, anchor latch assemblies, shear-type anchor latch assemblies, no-go locators, and the like.

A "packer" is a device that can be run into a wellbore with a smaller initial outside diameter that then expands externally to seal the wellbore. Packers employ flexible, elastomeric seal elements that expand. The two most common forms are the production or test packer and the inflatable packer. The expansion of the former may be accomplished by squeezing the elastomeric elements (somewhat doughnut shaped) between two plates or between two conical frusta pointed inward, forcing the elastomeric elements' sides to bulge outward. The expansion of the latter may be accomplished by pumping a fluid into a bladder, in much the same fashion as a balloon, but having more robust construction. Production or test packers may be set in cased holes and inflatable packers may be used in open or cased holes. They may be run down into the well on wireline, pipe or coiled tubing. Some packers are designed to be removable, while others are permanent. Permanent packers are constructed of materials that are easy to drill or mill out. A packer may be used during completion to isolate the annulus from the production conduit, enabling controlled production, injection or treatment. A typical packer assembly incorporates a means of securing the packer against the casing or liner wall, such as a slip arrangement, and a means of creating a reliable hydraulic seal to isolate the annulus, typically by means of an expandable elastomeric element. Packers are classified by application, setting method and possible retrievability. Inflatable packers are capable of relatively large expansion ratios, an important factor in through-tubing work where the tubing size or completion components can impose a significant size restriction on devices designed to set in the casing or liner below the tubing. Seal elements may either be bonded-type, using nitrile rubber seal elements, or chevron-type, available with seal elements comprising one or more proprietary elastomers such as those known under the trade designations Viton®, as mentioned above, available from DuPont Dow Elastomers LLC, and Aflas®, as mentioned above, available from Asahi Glass Co., Ltd. Bonded-type and chevron-type seal elements may both comprise one or more thermoplastic polymers, such as the polytetrafluoroethylene known under the trade designation Teflon®, available from E.I. DuPont de Nemours & Company; the polyphenylene sulfide thermoplastics known under the trade designation Ryton® and polyphenylene sulfide-based alloys known under the trade designation Xtel®, both available from Chevron Phillips Chemical Company LP. Both bond-type and chevron-type seal elements are available from Schlumberger.

A "wellbore" may be any type of well, including, but not limited to, a producing well, a non-producing well, an injection well, a fluid disposal well, an experimental well, an exploratory well, and the like. Wellbores may be vertical, horizontal, deviated some angle between vertical and horizontal, and combinations thereof, for example a vertical well with a non-vertical component.

FIGS. 1-5 and 13 illustrate several oilfield assemblies having one or more oilfield elements that may benefit from use of coated polymeric substrates. When an oilfield element is referred to by numeral, if that oilfield element may comprise a coated polymeric susbstrate it will be indicated with an asterisk (*). It will be understood that not all of the described oilfield elements that may comprise coated polymeric substrates need be the same in composition (coating or substrate); indeed, not all of the possible coated polymeric substrate oilfield elements need actually be comprised of coated polymeric substrates. In some embodiments, perhaps only the protector bag may be comprised of a coated polymeric substrate. Further, when an oilfield element is mentioned as being comprised of a coated polymeric substrate, the polymeric substrate may itself be a component of a larger structure, for example coated onto or placed adjacent another material, for example a metallic component.

FIG. 1 illustrates a first oilfield assembly 10 designed for deployment in a well 18 within a geological formation 20 containing desirable production fluids, such as petroleum. In a typical application, a wellbore 22 is drilled and lined with a wellbore casing 24. Wellbore casing 24 typically has a plurality of openings 26, for example perforations, through which production fluids may flow into wellbore 22.

Oilfield assembly 10 is deployed in wellbore 22 by a deployment system 28 that may have a variety of forms and configurations. For example, deployment system 28 may comprise tubing 30 connected to pump 12* by a connector 32*. Power is provided to a submersible motor 14* via a power cable 34*. Motor 14*, in turn, powers centrifugal pump 12*, which draws production fluid in through a pump intake 36* and pumps the production fluid to the surface via tubing 30.

It should be noted that the illustrated oilfield assembly 10 is merely an exemplary embodiment. Other oilfield elements may be added to the oilfield assembly, and other deployment systems may be implemented. Additionally, the production fluids may be pumped to the surface through tubing 30 or through the annulus formed between deployment system 28 and wellbore casing 24. In any of these configurations of oilfield assembly 10, it may be desirable to be able to use two or more centrifugal pump stages having different operating characteristics. Tubing 30 may be replaced by jointed pipe, which may include flanges and in that case flange gaskets*.

In certain embodiments, oilfield assembly 10 may have one or more sections of motor protector 16* disposed about motor 14*. A schematic cross-sectional view of an exemplary embodiment of oilfield assembly 10 is provided in FIG. 2. As illustrated, oilfield assembly 10 comprises pump 12*, motor 14*, and various motor protection components disposed in a housing 38. Pump 12* is rotatably coupled to motor 14* via a shaft 40, which extends lengthwise through the housing 38 (for example, one or more housing sections coupled together). Oilfield assembly 10 and shaft 40 may have multiple sections, which can be intercoupled via couplings and flanges. For example, shaft 40 has couplings 42* and 44* and an intermediate shaft section 46 disposed between pump 12* and motor 14*.

A variety of seals, filters, absorbent assemblies and other protection elements also may be disposed in housing 38 to protect motor 14*. A thrust bearing 48* is disposed about shaft 40 to accommodate and support the thrust load from pump 12*. A plurality of shaft seals, such as shaft seals 50* and 52*, are also disposed about shaft 40 between pump 12* and motor 14* to isolate a motor fluid 54 in motor 14* from external fluids, such as well fluids and particulates. Shaft seals 50* and 52* also may include stationary and rotational components, which may be disposed about shaft 40 in a variety of configurations. Oilfield assembly 10 also may include a plurality of moisture absorbent assemblies, such as moisture absorbent assemblies 56, 58, and 60, disposed throughout housing 38 between pump 12* and motor 14*. These moisture absorbent assemblies 56-60 absorb and isolate undesirable fluids (for example, water, $H_2S$, and the like) that have entered or may enter housing 38 through shaft seals 50* and 52* or through other locations. For example, moisture absorbent assemblies 56 and 58 may be disposed about shaft 40 at a location between pump 12* and motor 14*, while moisture absorbent assembly 60 may be disposed on an opposite side of motor 14* adjacent a protector bag 64*. In addition, the actual protector section above the motor may include a hard bearing head with shedder.

Figure 2:
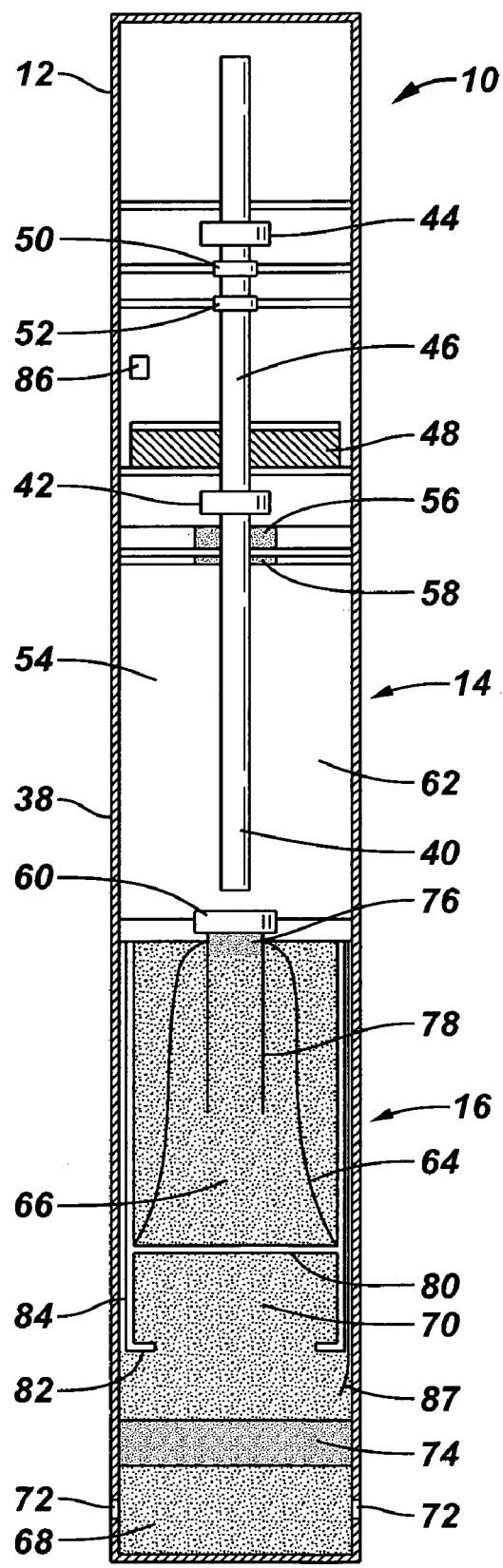
FIG. 2 is a diagrammatical cross-section of the pump of FIG. 1 having a polymer-coated elastomer protector bag in accordance with the invention to separate well fluid from motor fluid, which is positively pressurized within the motor housing.

As illustrated in FIG. 2, motor fluid 54 is in fluid communication with an interior 66* of protector bag 64*, while well fluid 68 is in fluid communication with an exterior 70* of protector bag 64*. Accordingly, protector bag 64* seals motor fluid 54 from well fluid 68, while positively pressurizing motor fluid 54 relative to the well fluid 68 (e.g., a 50 psi pressure differential). The ability of elastomeric protector bag 64* to stretch and retract ensures that motor fluid 54 maintains a higher pressure than that of well fluid 68. A separate spring assembly or biasing structure also may be incorporated in protector bag 64* to add to the resistance, which ensures that motor fluid 54 maintains a higher pressure than that of well fluid 68.

Protector bag 64* may embody a variety of structural features, geometries and materials as known in the art to utilize the pressure of well fluid 68 in combination with the stretch and retraction properties of protector bag 64* to positively pressurize motor fluid 54. Initially, motor fluid 54 is injected into motor 14* and protector bag 64* is pressurized until a desired positive pressure is obtained within motor 14*. For example, oilfield assembly 10 may set an initial pressure, such as 25-100 psi, prior to submerging into the well. An exterior chamber 70 adjacent protector bag 64* also may be filled with fluid prior to submerging the system into the well. Well fluid 68 enters housing 38 through ports 72 and mixes with this fluid in exterior chamber 70 as oilfield assembly 10 is submersed into the well. Protector bag 64* also may have various protection elements to extend its life and to ensure continuous protection of motor 14*. For example, a filter 74 may be disposed between ports 72 and exterior chamber 70 of protector bag 64* to filter out undesirable fluid elements and particulates in well fluid 68 prior to fluid communication with exterior chamber 70. A filter 76 also may be provided adjacent interior 66* of protector bag 64* to filter out motor shavings and particulates. As illustrated, filter 76 is positioned adjacent moisture absorbent assembly 60 between motor cavity 62 and interior 66* of protector bag 64*. Accordingly, filter 76 prevents solids from entering or otherwise interfering with protector bag 64*, thereby ensuring that protector bag 64* is able to expand and contract along with volume variations in the fluids.

A plurality of expansion and contraction stops also may be disposed about protector bag 64* to prevent over and under extension and to prolong the life of protector bag 64*. For example, a contraction stop 78* may be disposed within interior 66* of protector bag 64* to contact an end section 80* and limit contraction of protector bag 64*. An expansion stop 82* also may be provided at exterior 70* of protector bag 64* to contact end section 80* and limit expansion of the protector bag. These contraction and expansion stops 78* and 82* may have various configurations depending on the elastomer utilized for protector bag 64* and also depending on the pressures of motor fluid 54 and well fluid 68. A housing 84* also may be disposed about exterior 70* to guide protector bag 64* during contraction and expansion and to provide overall protection about exterior 70*.

As oilfield assembly 10 is submersed and activated in the downhole environment, the internal pressure of motor fluid 54 may rise and/or fall due to temperature changes, such as those provided by the activation and deactivation of motor 14*. A valve 86* may be provided to release motor fluid 54 when the pressurization exceeds a maximum pressure threshold. In addition, another valve may be provided to input additional motor fluid when the pressurization falls below a minimum pressure threshold. Accordingly, the valves maintain the desired pressurization and undesirable fluid elements are repelled from motor cavity 62 at the shaft seals 50* and 52*. Oilfiled assembly 10 also may have a wiring assembly 87* extending through housing 38 to a component adjacent protector bag 64*. For example, a variety of monitoring components may be disposed below protector bag 64* to improve the overall operation of oilfield assembly 10. Exemplary monitoring components comprise temperature gauges, pressure gauges, and various other instruments, as should be appreciated by those skilled in the art.

Figure 3:
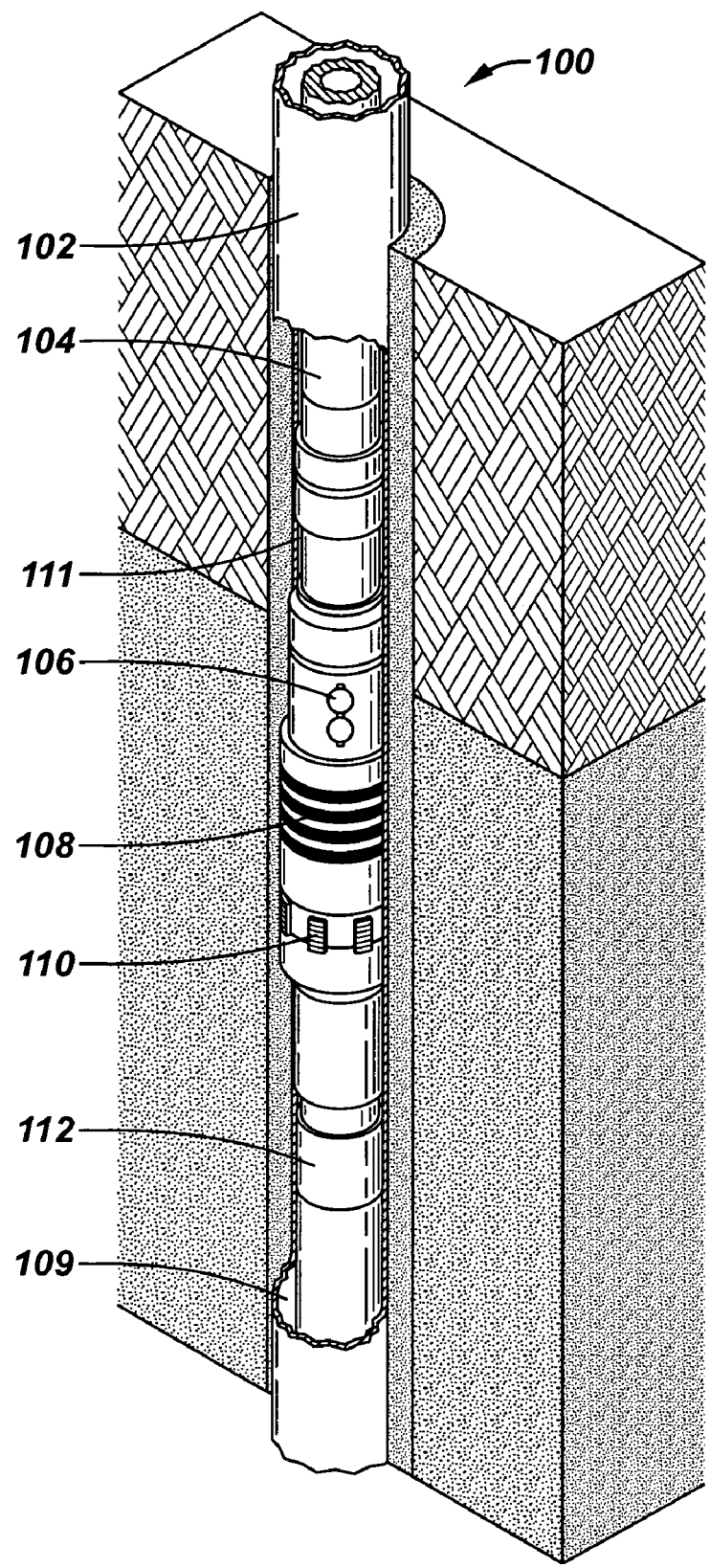
FIG. 3 is a schematic side elevation view, partially in cross-section, of a packer having polymer-coated elastomer packer elements in accordance with the invention.

FIG. 3 is a schematic perspective view, partially in cross-section, and not necessarily to scale, of another oilfield assembly 100 in accordance with the invention, in this case a packer. Although oilfield assembly 100 comprises in many instances more than one oilfield element, such as production tubing 104 and packer elements 108, oilfield assembly 100 is often referred to as a packer, and therefore this oilfield assembly may be considered an oilfield element which is part of a larger oilfield assembly, such as oilfield assembly 10 of FIGS. 1 and 2. A production liner or casing 102 is shown, partially broken away to reveal production tubing 104, hold-down slips 106, set-down slips 110, and a plurality of packer elements 108* which, when expanded, produce a hydraulic seal between a lower annulus 109 and an upper annulus 111.

FIGS. 4A and 4B illustrate how two actuation arrangements may be used to directly override two flapper-style check valves, allowing uphole flow in a flow reversing oilfield assembly. The flow reversing oilfield assembly 150 illustrated schematically in FIG. 4A may include a motor 152*, motor shaft 153, and movable valve gate 156 positioned in a secondary channel 154, which moves dual flapper actuators 157 and 159, each having a notch 158 and 160, respectively. Movement up of shaft 153, gate 156, actuators 157 and 159, and notches 158 and 160 mechanically opens flappers 162 and 164, allowing reverse flow up tubing primary flow channel 151. O-ring seals 166* and 168* isolate production fluid from motor fluid 172. The flow reversing oilfield assembly 180 illustrated in FIG. 4B uses dual solenoids 184 and 182 to charge a hydraulic system and release the pressure. When the hydraulic system is charged, the hydraulic pressure in conduits 185, 185*a*, and 185*b* shift pistons 191 and 192, mechanically opening flappers 162 and 164, while high pressure below flapper 165 opens it, allowing reverse flow up tubing primary channel 151. When it is desired to stop reverse flow, or power or communication is lost, solenoid 184 is activated, releasing hydraulic pressure in conduits 185, 185*a*, and 185*b*, allowing flappers 162 and 164 to close in safe position. Note that an oil compensation system 194 may be used to protect and lubricate the motor, gears, and other mechanical parts, such as ball 193* and spring 195* of a check valve. Alternatively, these parts may be comprised of coated polymeric substrates in accordance with the invention. Various O-ring seals, such as seals 196* and 197* may be comprised of coated polymeric substrate, such as coated elastomers.

Figure 5A:
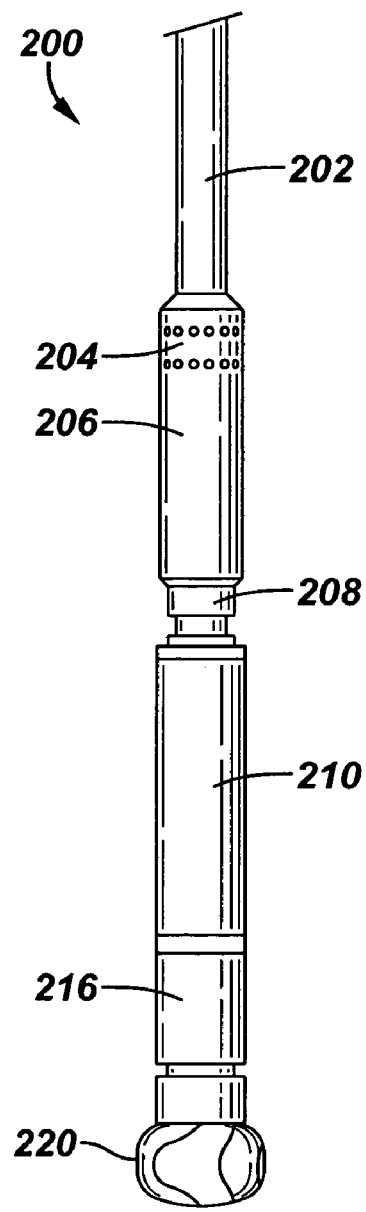
FIGS. 5A and 5B are schematic side elevation views of two bottom hole assemblies which may utilize polymer-coated elastomer components in accordance with the invention.
Figure 5B:
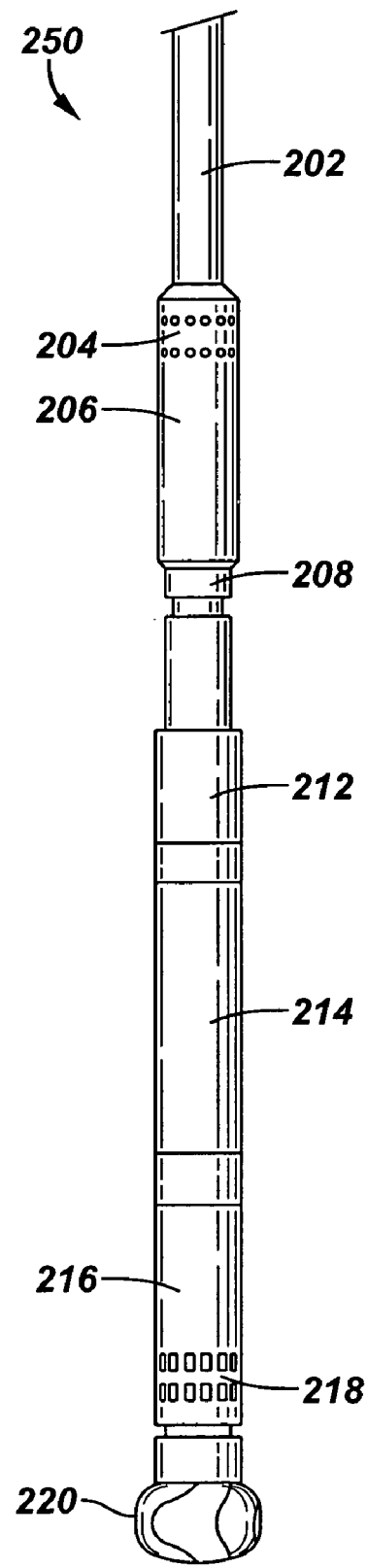

FIGS. 5A and 5B illustrate two oilfield assemblies 200 and 250 known as bottom hole assemblies, or BHAs. Bottom hole assemblies have many wellbore elements that may benefit from use of coated polymeric substrates in accordance with the teachings of the invention. The lower portion of the drillstring, consisting of (from the bottom up in a vertical well) the bit, bit sub, a mud motor (in certain cases), stabilizers, drill collars, heavy-weight drillpipe, jarring devices ("jars") and crossovers for various threadforms. The bottomhole assembly must provide force for the bit to break the rock (weight on bit), survive a hostile mechanical environment and provide the driller with directional control of the well. Oftentimes the assembly includes a mud motor, directional drilling and measuring equipment, measurements-while-drilling (MWD) tools, logging-while-drilling (LWD) tools and other specialized devices. A simple BHA may comprise a bit, various crossovers, and drill collars, however they may include many other wellbore elements leading to a relatively complex wellbore assembly.

Each oilfield assembly 200 and 250 may comprise tubing 202, a connector 204*, a check valve assembly 206*, and a pressure disconnect 208*. Oilfield assembly 200 is a straight hole BHA, and includes drill collars 210, a mud pump 216*, and a drill bit 220. Oilfield assembly 250 is a BHA for buildup and horizontal bore holes, and includes an orienting tool 212*, an MWD section in a non-magnetic drill collar 214, mud pump 216*, and drill bit 220, as well as an adjustable bent housing 218*.

Figure 13A:
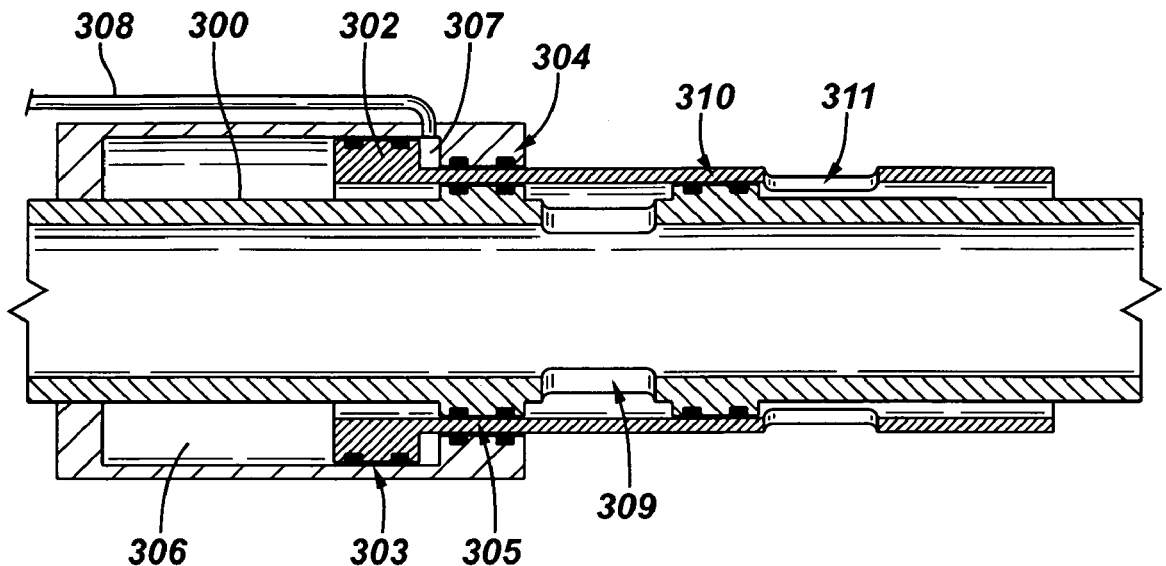
FIGS. 13A and 13B are schematic cross-sectional views of a flow control valve that may be utilized to control the flow of petroleum production or well fluids out of specific zones in a well or reservoir, or injection of fluid into specific zones, the valve utilizing polymer-coated elastomeric components in accordance with the invention.
Figure 13B:
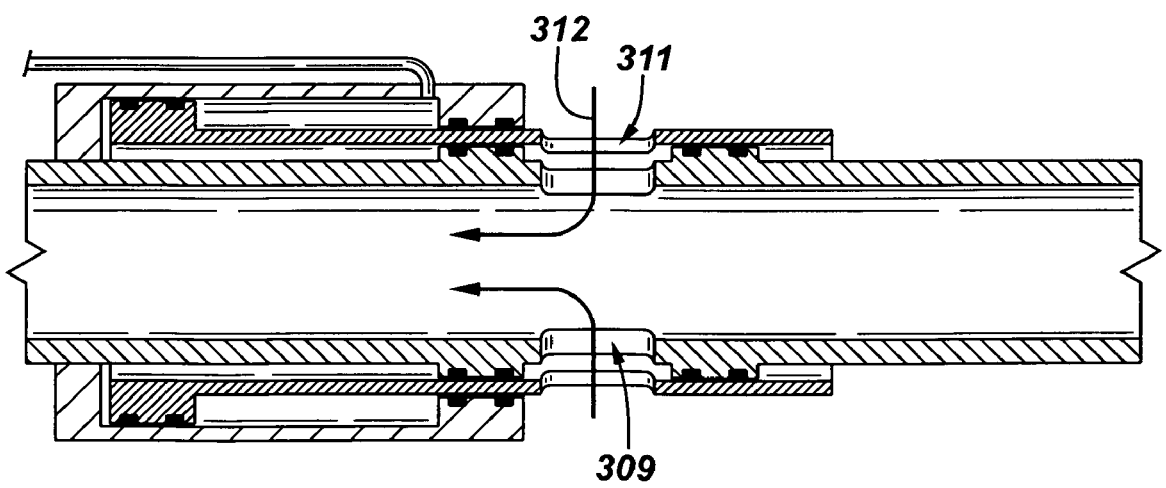

FIGS. 13A and 13B are schematic cross-sectional views of a flow control valve that may be utilized to control the flow of petroleum production or well fluids out of specific zones in a well or reservoir, or injection of fluid into specific zones, the valve utilizing polymer-coated elastomeric components in accordance with the invention. These flow control valves may be operated by forces produced and controlled hydraulically, electrically or by a hybrid combination of appropriate electric and hydraulic components.

FIGS. 13A and 13B illustrate one embodiment of a hydraulically actuated valve. An inner tubular member 300 is contained within an actuator housing 301. A sliding sleeve 302 is equipped with sliding seals 303*, 304* and 305*, thereby defining a confined volume chamber 306 and a controlled volume chamber 307. If confined volume chamber 306 is pre-charged with a relatively inert gas such as nitrogen at sufficiently high pressure compared to the pressure in controlled volume chamber 307, then sliding sleeve 302 will be forced to the right, thereby closing fluid flow through an opening 309 in inner tubing 300 and an opening 311 in sliding sleeve 302. A seal 310 prevents the flow of fluid between tubular member 300 and sliding sleeve 302. If hydraulic oil is introduced into a tube 308 at a sufficiently high pressure then the force produced within controlled volume chamber 307 will be sufficient to overcome the force due to the pressurized gas in confined volume chamber 306 thereby resulting in sliding sleeve 302 moving to the left as illustrated in FIG. 13B. In FIG. 13B the movement of sliding sleeve 302 is sufficient to position opening 309 of inner tubular member 300 directly in-line with opening 311 in sliding sleeve 302. In this controlled configuration production fluid 312 can enter into the tubular member and thereby be unimpeded to flow into the tubing and up to the surface, assuming there is a fluid flow path and that the pressure is sufficient to lift the fluid to surface.

Sliding seals 303, 304, and 305 may be comprised of at least one of: O-rings, T-seals, chevron seals, metal spring energized seals, or combination of these to make a seal stack.

In application, sealing elements tend to adhere to one or both interface metal surfaces of the valve or sealed assembly. This can result in fluid or gas leaking through static or dynamic valve seals. In static, or non-moving seals, destructive mechanical stresses may also result from the difference in coefficient of thermal expansion of the mating parts made of differing materials, for example elastomers, polymers, metals or ceramics, or composites of these materials. Although the sealing element may change very little in size between hot and cold conditions, its expansion or contraction is relatively insignificant compared to the adjacent metal sealing elements of the valve, and since sealing elements are mechanically stressed with every thermal cycle, the sealing element eventually fractures thereby allowing fluid or gas to escape.

The polymer coatings discussed herein may significantly improve the performance and lifetime of static seals and dynamic (or sliding sleeve) seals in the aforementioned fluid flow control valves by virtue of the coating's lubricant and wear resistance characteristics and its relative impermeability to gases and fluids. For example a 2 μm coating imparts dry lubricant and wear resistance characteristics to the surface of the sliding seals. The lubricity of coating such as Parylene allows the sealing element to slide across the valve surfaces rather than sticking, thereby accommodating expansion and contraction differences that can fracture the seal. Since the sealing elements are not damaged in use, they can serve their intended sealing function and leaks are eliminated during a long functional life.

As may be seen by the exemplary embodiments illustrated in FIGS. 1-5 and 13 there are many possible uses of coated polymeric substrates formed into oilfield elements and assemblies. Alternatives are numerous. For example, certain electrical submersible pumps, which are modified versions of a pumping system known under the trade designation Axia™, available from Schlumberger Technology Corporation, may feature a simplified two-component pump-motor configuration. Pumps of this nature generally have two stages inside a housing, and a combined motor and protector bag, which may be comprised of a coated polymeric substrate in accordance with the invention. This type of pump may be built with integral intakes and discharge heads. Fewer mechanical connections may contribute to faster installation and higher reliability of this embodiment. The combined motor and protector assembly is known under the trade designation ProMotor™, and may be prefilled in a controlled environment. The pump may include integral instrumentation that measures downhole temperatures and pressures.

Other alternative electrical submersible pump configurations that may benefit from components comprised of polymer coated polymeric substrates include an ESP deployed on cable, an ESP deployed on coiled tubing with power cable strapped to the outside of the coiled tubing (the tubing acts as the producing medium), and more recently a system known under the trade designation REDACoil™, having a power cable deployed internally in coiled tubing. Certain pumps may have "on top" motors that drive separate pump stages, all pump stages enclosed in a housing. A separate protector bag is provided, as well as an optional pressure/temperature gauge. Also provided in this embodiment may be a subsurface safety valve (SSSV) and a chemical injection mandrel. A lower connector may be employed, which may be hydraulically releasable with the power cable, and may include a control line and instrument wire feedthrough. A control line set packer completes this embodiment. The technology of bottom intake ESPs (with motor on the top) has been established over a period of years. It is important to securely install pump stages, motors, and protector within coiled tubing, enabling quicker installation and retrieval times plus cable protection and the opportunity to strip in and out of a live well. This may be accomplished using a deployment cable, which may be a cable known under the trade designation REDACoil™, including a power cable and flat pack with instrument wire and one or more, typically three hydraulic control lines, one each for operating the lower connector release, SSSV, and packer setting/chemical injection. Any one or more of the deployment cable, power cable, SSSV, control line set packer, chemical injection mandrel, and the like may comprise polymer coated polymeric substrates, either in their O-ring seals or gaskets, as jackets for cables, as protector bags, and the like.

Oilfield assemblies of the invention may include many optional items. One optional feature may be one or more sensors located at the protector bag to detect the presence of hydrocarbons (or other chemicals of interest) in the internal motor lubricant fluid. The chemical indicator may communicate its signal to the surface over a fiber optic line, wire line, wireless transmission, and the like. When a certain chemical is detected that would present a safety hazard or possibly damage a motor if allowed to reach the motor, the pump may be shut down long before the chemical creates a problem.

In summary, generally, this invention pertains primarily to oilfield elements and assemblies comprising a conformal protective coating deposited onto a polymeric substrate, where the substrate may be a thermoplastic, thermoset, elastomeric, or composite material. One coating embodiment is a Parylene coating. Parylene is common name for the family of poly(p-xylylene)s. The Parylene process was commercialized in the mid-1960s by Union Carbide Corporation, who then transferred patent rights to Cookson Electronics. Parylene forms an almost imperceptible plastic conformal coating that protects materials from many types of environmental problems. While the following process description focuses on the Parylene deposition process, which involves no solvent or diluent, and wherein the monomer undergoes no reaction other than with itself, the invention is not so limited. Any process and monomer (or combination of monomers, or prepolymer or polymer particulate or solution) that forms a conformal polymeric coating may be used. Examples of other methods include spraying processes (e.g. electrospraying of reactive monomers, or non-reactive resins); sublimation and condensation; and fluidized-bed coating, wherein, a single powder or mixture of powders which react when heated may be coated onto a heated substrate, and the powder may be a thermoplastic resin or a thermoset resin.

Parylene Deposition Process. Parylene is a transparent polymer conformal coating that may be deposited from a gas phase in a medium vacuum. These polymers are polycrystalline and linear in nature, possess superior barrier properties, have extremely good chemical stability, that is, are relatively inert to the hostile well environment and because of the deposition process can be applied uniformly to virtually any surface and shape. A typical Parylene protective coating is about 1,000 times thinner than a plastic sandwich bag. The Parylene deposition process (not a part of the present invention, and publicly available at Cookson Electronics Speciality Coating Systems' website, http://www.scscookson.com.parylene-services/index.cfm) uses a dry, powdered material known as dimer (formula (I) herein) to create a thin, transparent film. There is no intermediate liquid phase and no "cure" cycle. Parylene deposition is via a gas vapor phase deposition; therefore, it is not a line-of-sight coating process. All sides of an object exposed to the vapor phase are uniformly impinged and coated by the gaseous monomer. Multiple parts (ESP Protector bags, O-rings, and seals for example) may be coated at the same time in an apparatus similar to a clothes washer to make the process very economical to mass-produce finished parts. The process consists of three distinct steps, done in the presence of a medium vacuum.

1. Vaporization, where Parylene is vaporized from its solid dimer state. This is accomplished by the application of heat under vacuum.

2. Pyrolysis (cleaving) of the gaseous form of the dimer into a monomer may be achieved by using a high temperature tube furnace.

3. Polymerization of the gaseous monomer occurs at room temperature as the Parylene deposits as a polymer onto the substrate in the vacuum chamber.

EXAMPLES

The tests and evaluations described in the following Examples demonstrate that a Parylene coating is highly effective in protecting an elastomer substrate; therefore, it can significantly lengthen the operational life of the protector bag compared to a non-coated bag. The Parylene coating protects the elastomer from chemical attack and decreases its permeability to conductive and corrosive fluids and gases such as salt water and $H_2S$. Therefore it lengthens the life of electric submergible electric motors used to operate downhole pumps. However, the process can be applied generally to many elastomers used in the oilfield. The Example test results show the benefits can be significant.

Objectives of the Examples were to investigate if a Parylene coating could help improve an elastomer's resistance to the following hazards:

1. Hydrogen sulfide sour gas permeation through elastomer; and

2. Chemical attack from downhole fluids.

A prerequisite for acceptance of the protective coating was that the improvement in the elastomer must be made without interfering with the basic mechanical behavior, dimensions, and functions (i.e., the form, fit, or function) of the protector bags.

Materials

1. Elastomer

Protector bag compound: a base elastomer known under the trade designation Aflas®, available from Asahi Glass Co., Ltd., was used to compound the elastomer test slabs (compounded slabs known under the trade designation MS-10-259 were provided by the Schlumberger Lawrence Product Center, Lawrence, Kans.). The base elastomer known under the trade designation Aflas® is a vinylidene fluoride type fluoroelastomer. The compounded slabs differed only slightly from the base elastomer by the addition of additives whose identity and weight percentages were not relevant to the tests conducted or the desired results.

2. Parylene Coating

Samples coated with a fluorinated parylene known under the trade designation Parylene Nova HT were primarily studied herein, due to excellent thermal stability (up to 450° C.) of this type of coating. Table 1 lists the main properties of the Parylene known under the trade designation Parylene Nova HT. The supplier, Cookson Electronics Speciality Coating Systems, provided this information (see their web site at (http://www.scscookson.com/parvlene_services/index.cfm).

TABLE 1

Material property data for Parylene Nova HT*

| Physical and Mechanical | Unit | Parylene Nova HT | Test Method |
| --- | --- | --- | --- |
| Tensile Strength | PSI | 7,500 | ASTM D882, 25° C. |
| Modulus | PSI | 370,000 | ASTM 5026 DMA |
| Elongation to break | | 10% | ASTM D882 |
| Hardness | Rockwell | R122 | ASTM D785 |
| Coefficient of Friction | | | |
| Static | | 0.145 | ASTM D1894 |
| Dynamic | | 0.130 | |
| Barrier | | | |
| Water absorption | % | <0.01 | ASTM D570 |
| Gas permeabilities | cc * mm/ m2 * day | | |
| $N_2$ | | 4.8 | Mocon MULTITRAN |
| $O_2$ | | 23.5 | 400 |
| $CO_2$ | | 95.4 | |

*Parylene Nova HT is a trademark and service mark of Specialty Coating Systems.

Experimental Results

Parylene coating: Elastomer slabs were coated with Parylene C, N, and Nova HT at Special Coating Systems, Clear Lake, Wis. and Parylene Coating Service, Houston, Tex. Only samples coated with Parylene Nova HT at Special Coating Systems were used for further study listed below.

Fatigue tests on both non-coated and coated elastomer samples: tensional cycling 1000 times to 20% strain at 1%/second strain rate, at 93° C. (200° F). Testing was conducted at Axel Products, Ann Arbor, Mich.

$H_2S$ permeation test

The following samples were tested with 5% $H_2S$, balance $N_2$ gas, 93° C. (200° F), 14 days, at InterCorr, International, Houston, Tex.

A. as-received elastomer

B. fatigued elastomer

C. elastomer coated with Parylene Nova HT

D. elastomer coated with Parylene Nova HT and fatigued

Scanning electronic microscopy (SEM) inspection of samples A-D was conducted at Schlumberger Research Center materials lab.

Results and Discussion $H_2S$ Permeation Test Results

TABLE 2

Summary of H₂S permeation test results

| Sample | Sample description | Permeability, μmoles/cm²/day |
|---|---|---|
| A | compounded Aflas*, as received | 0.249 |
| B | Fatigued, compounded Aflas* | 0.124 |
| C | Compounded Aflas*, coated with Parylene Nova HT | 0.072 |
| D | Compounded Aflas*, coated with Parylene Nova HT, and fatigued | No permeation detected within testing period |

*"Aflas" is a trademark of Asahi Glass Co., Ltd.

Figure 6:
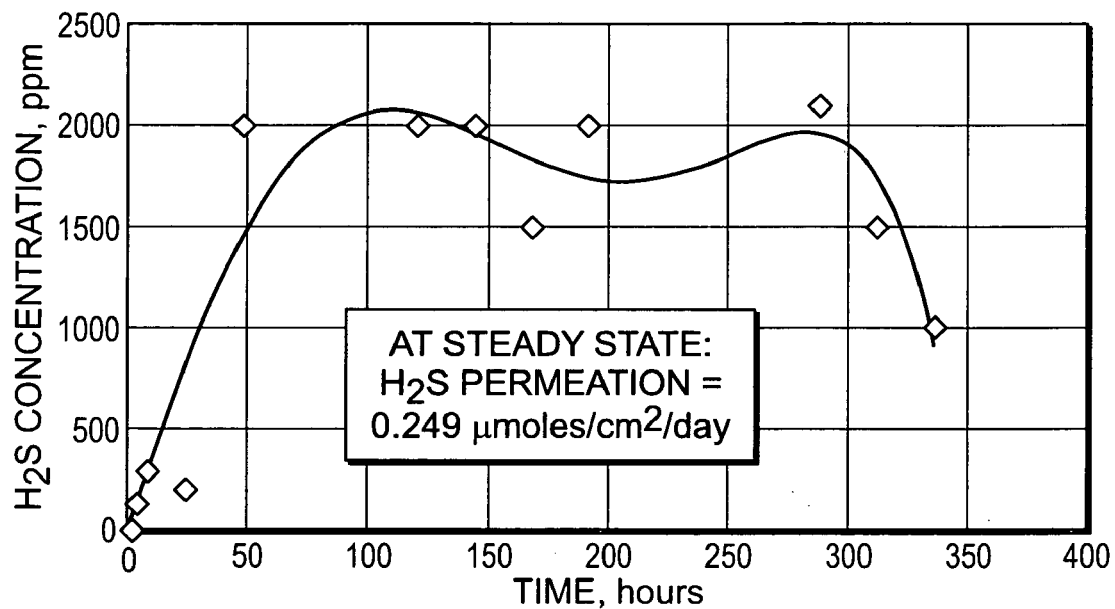
FIGS. 6-8 show example test results of $H_2S$ gas permeability resistance tests of one elastomer in non-coated state, coated state, and coated and fatigued state, respectively.
Figure 7:
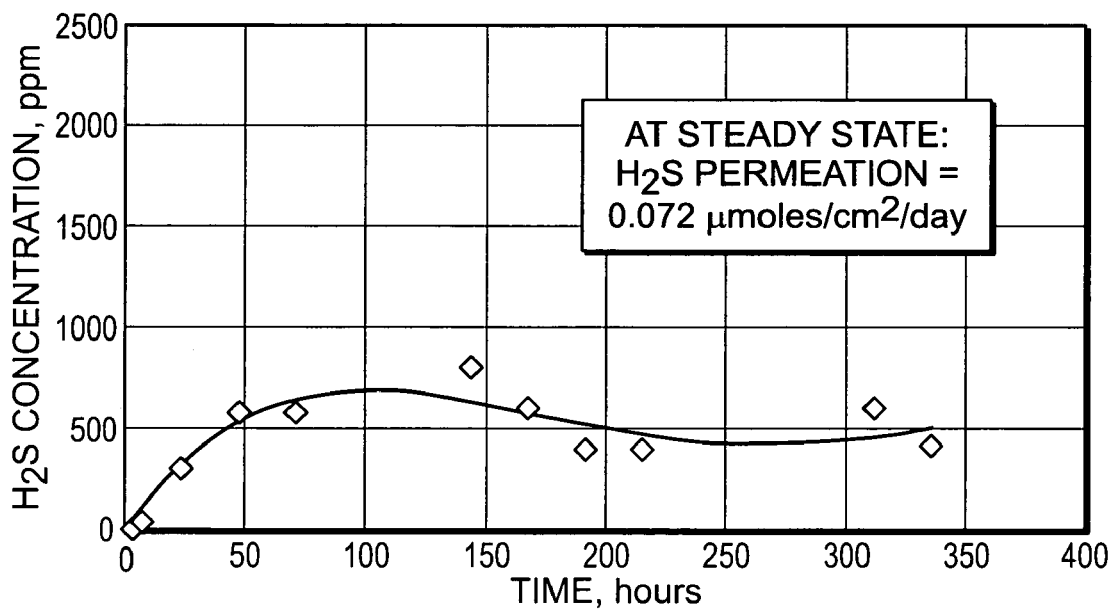
Figure 8:
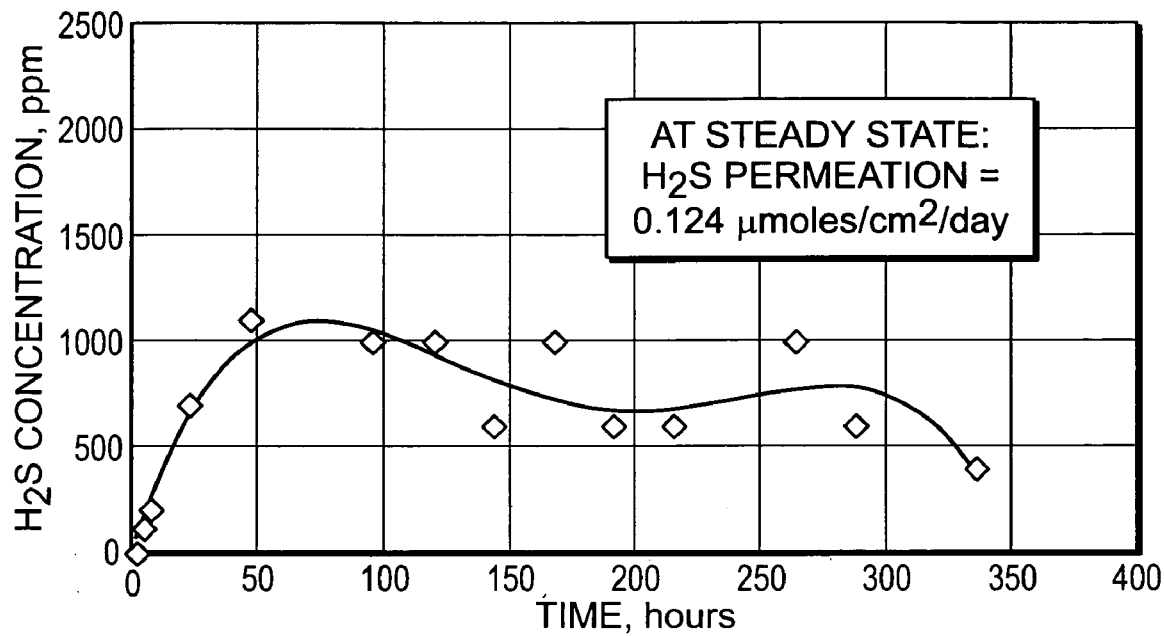
Figure 9:
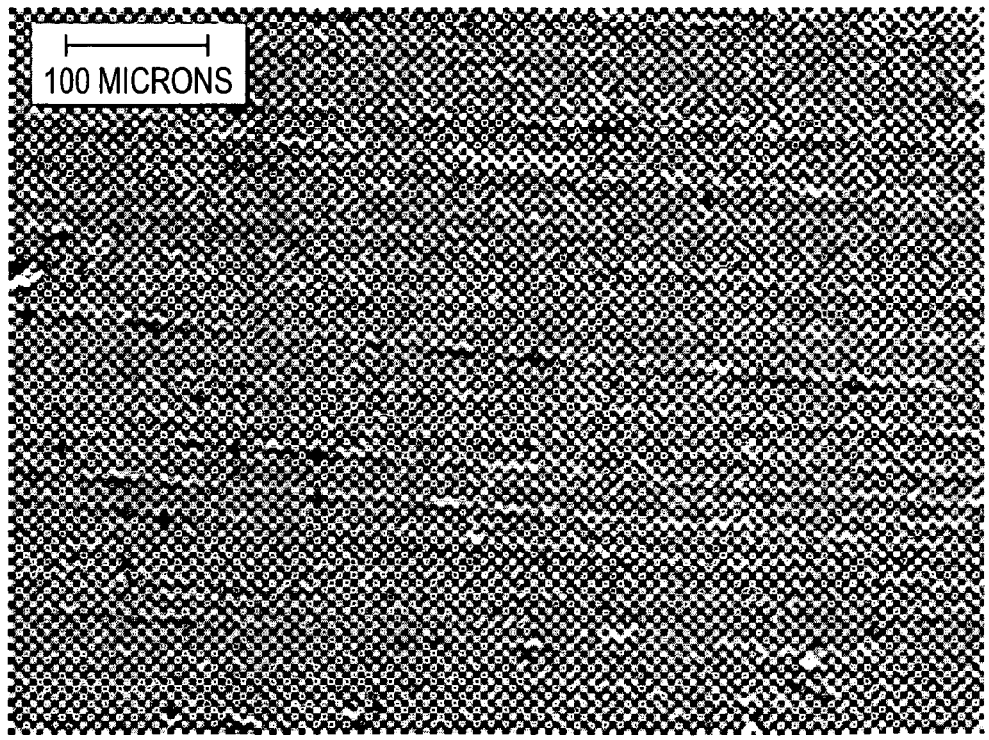
FIGS. 9 and 10 show scanning electron microscopic (SEM) inspections of one elastomer as purchased, and as fatigued.
Figure 10:
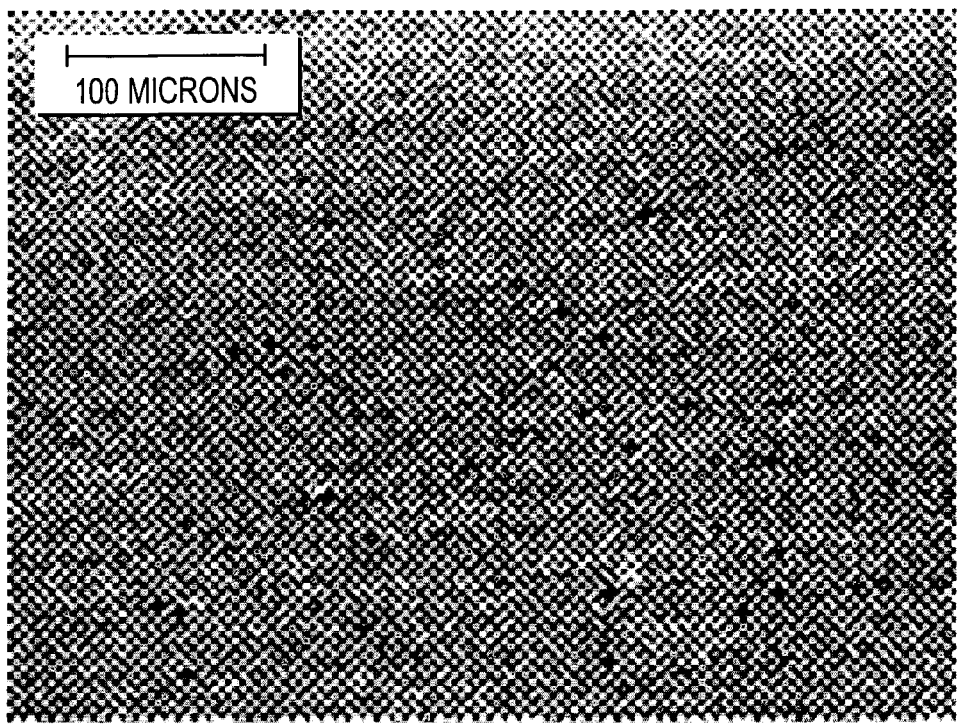
Figure 11A:
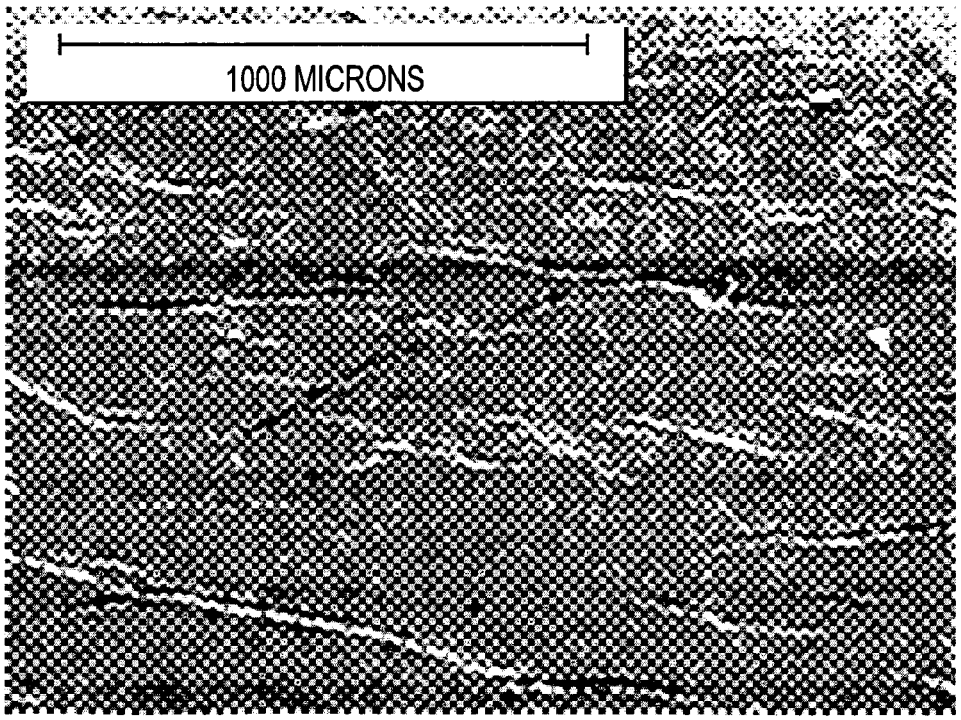
FIGS. 11A and 11B show SEM inspections of one coated elastomer in accordance with the invention.
Figure 11B:
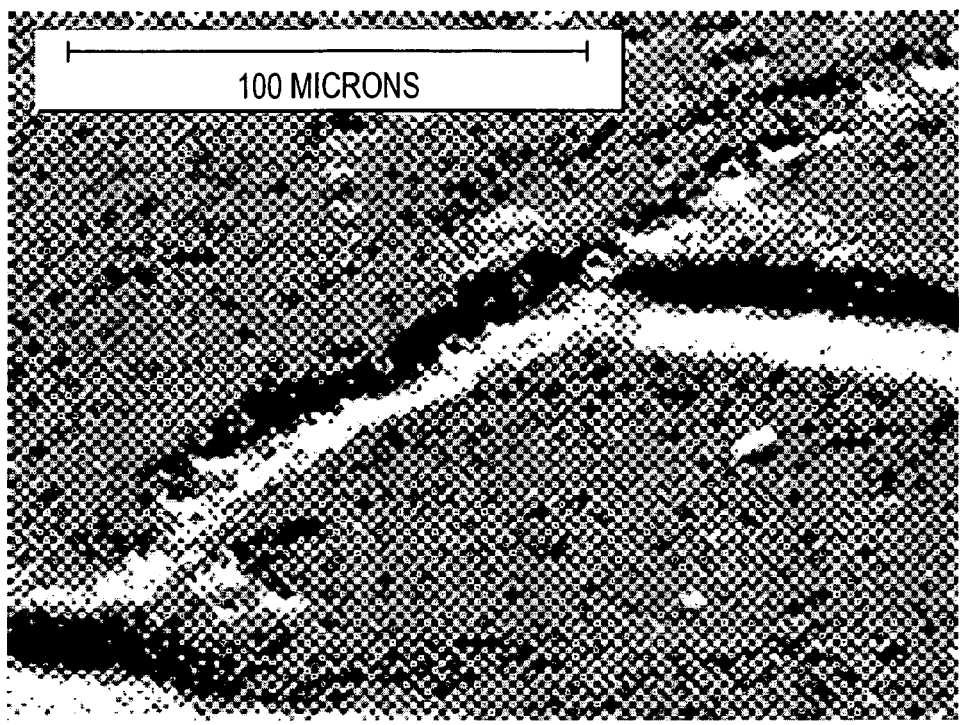

From Table 2 and comparison of FIGS. 6-8, it can be seen that sample D, which is coated and fatigued, showed the best H₂S permeation resistance. It is apparent that Parylene Nova HT coating significantly improves H₂S permeation resistance of the elastomer. Interestingly, it is found that mechanical fatigue of samples also helps improve H₂S permeation resistance in general.

SEM Inspection

Figure 12A:
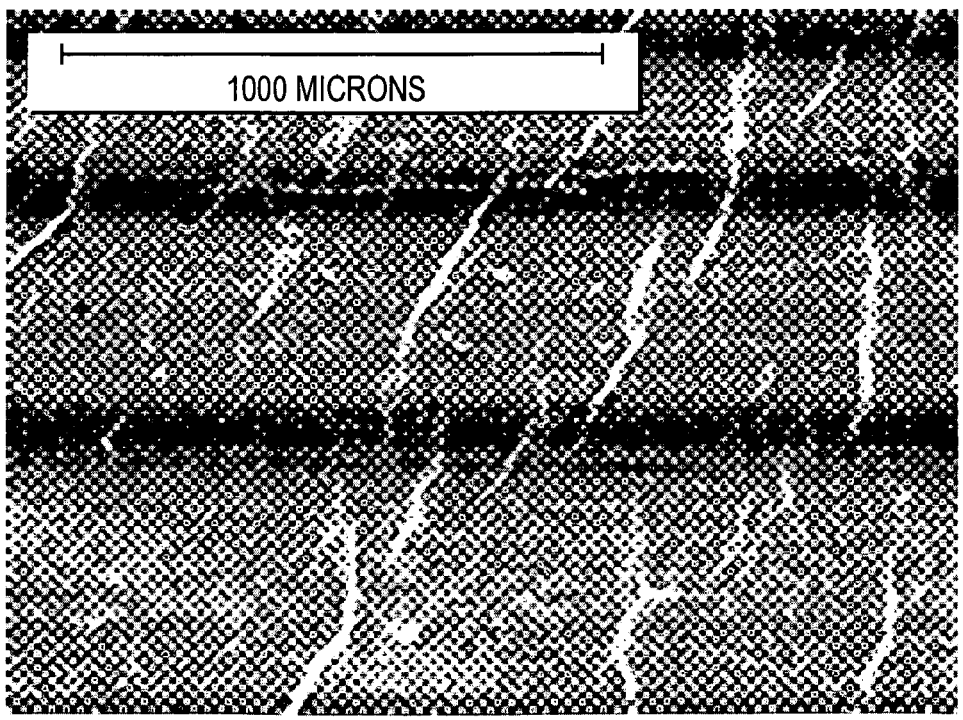
FIGS. 12A and 12B show SEM inspections of the coated elastomer of FIGS. 11A and 11B after fatigue.
Figure 12B:
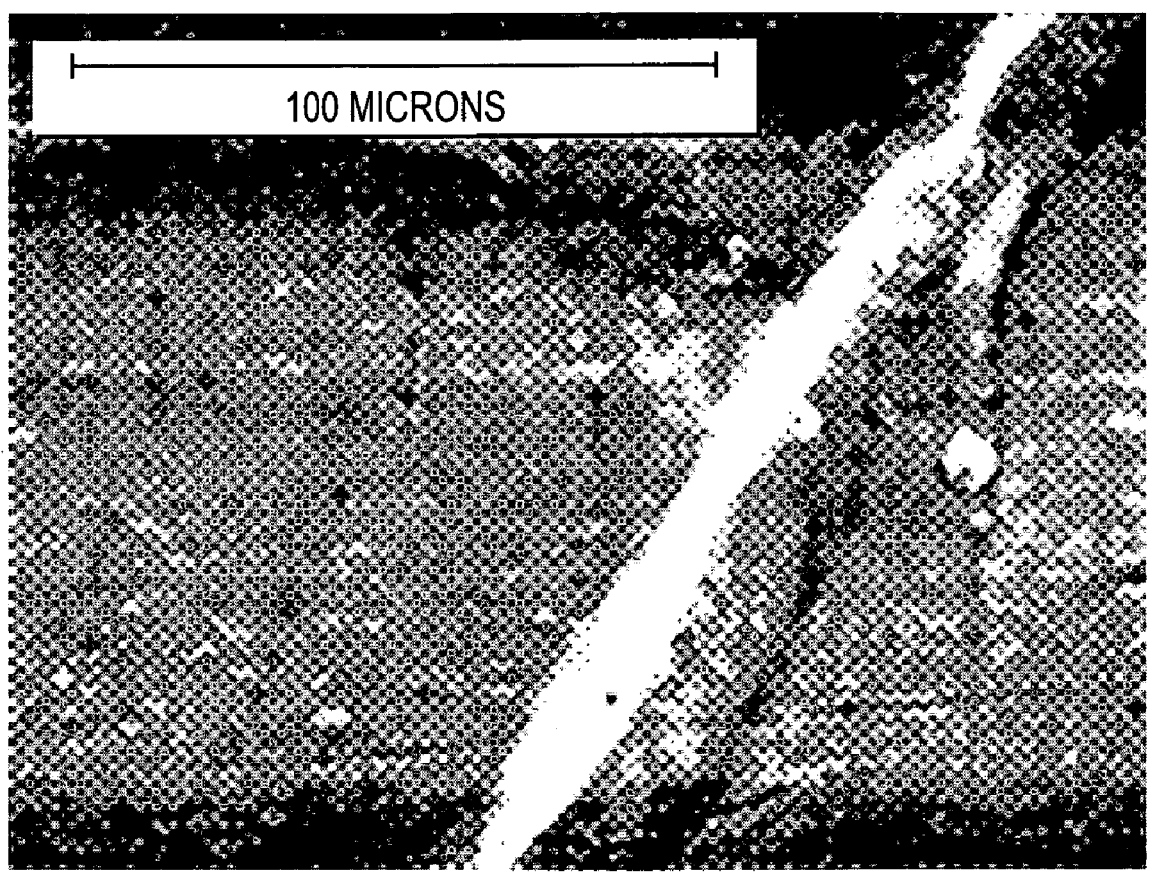

Craze-like cracks are observed in both coated samples with and without fatigue cycling (FIGS. 12 and 13). This may indicate debonding between the rubber substrate and the coating. Regardless of the existence of these cracks, H₂S permeation resistance of the elastomer known under the trade designation Aflas was still improved significantly.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures.

What is claimed is:

1. An apparatus comprising:
   (a) a polymeric substrate formed into an oilfield element; and
   (b) a polymeric coating adhered to at least a portion of the polymeric substrate, wherein
   the polymeric coating comprises a polymer having the formula $-[R(R^1_x)(R^2_y)]_n-$, wherein R is C—C, aryl, or $-C(R^3_p)\text{-aryl-}C(R^5_r)(R^6_s)-$, and n is an integer ranging from 10 to 10,000,
   if R is C—C, then $R^1$ and $R^2$ are the same or different halogen atoms, x and y are integers ranging from 0 to 4, and x+y=4,
   if R is aryl, $R^1$ and $R^2$ are the same or different and are any organic or inorganic group that can be substituted on aromatic nuclei, and x and y are integers ranging from 0 to m, and x+y≦m, wherein m is the maximum number of substitution positions on the aryl,
   if R is $-C(R^3_p)(R^4_q)\text{-aryl-}C(R^5_r)(R^6_s)-$, x and y are integers ranging from 0 to m, and x+y≦m, wherein m is the maximum number of substitution positions on the aryl, $R^1$ and $R^2$ are attached to the aryl group and are independently selected from any organic or inorganic group that can be substituted on aromatic nuclei, $R^3$, $R^4$, $R^5$, are independently selected from halogen atoms and hydrogen atoms, p, g, r, and s may be 0, 1, or 2, with p+q=2 and r+s=2.

2. The apparatus of claim 1, wherein the polymer in the polymeric coating has the following formula

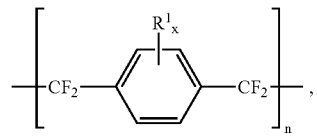

wherein, n is an integer ranging from 10 to 10,000, x is an integer ranging from 0 to 4, $R^1$ is selected from alkyl, aryl, alkenyl, amino, cyano, carboxyl, alkoxy, hydroxy alkyl, carbalkoxy, hydroxyl, nitro and a halogen atom.

3. The apparatus of claim 1, wherein the polymer in the polymeric coating is selected from poly-(p-xylylene poly-(chloro-p-xylylene), poly-(di-chloro-p-xylylene), poly-(bromo-p-xylylene), poly-(cyano-p-xylylene), and poly-(ethyl-p-xylylene).

4. The apparatus of claim 1, wherein R is aryl, and the polymer in the polymeric coating is selected from polynaphthalene, polyanthracene, polyphenanthrene, derivatives thereof, and combinations thereof.

5. The apparatus of claim 1, wherein R is C—C, and the polymer in the polymeric coating is selected from polytetrafluoroethylene, polychlorotrifluoroethylene, and combinations thereof.

6. The apparatus of claim 1 wherein the polymeric coating comprises polymers selected from thermoset polymers, thermoplastic polymers, and combinations thereof.

7. The apparatus of claim 1, wherein the polymeric coating is conformal to at least a portion of a surface of the polymeric substrate.

8. The apparatus of claim 7, wherein the polymeric coating comprises a polymer selected from polyurethanes, polyacrylates, polysilicones, and epoxy polymers.

9. The apparatus of claim 1, wherein the polymeric substrate comprises a polymer selected from thermoset polymers, thermoplastic polymers, elastomers, composites, and combinations thereof.

10. The apparatus of claim 1, wherein the polymeric coating is adhered to a primed surface of the polymeric substrate.

11. An oilfield element comprising:
    (a) an elastomer substrate; and
    (b) a coating adhered to at least a portion of the elastomer substrate, the coating comprising a polymer having the formula $-[R(R^1_x)(R^2_y)]_n-$, wherein:
    R is $-C(R^3_p)(R^4_q)\text{-aryl-}C(R^5_r)(R^6_s)-$;
    x and y are integers ranging from 0 to m, and x+y≦m, wherein m is the maximum number of substitution on the aryl group;
    $R^1$ and $R^2$ are attached to the aryl group and are independently selected from any organic or inorganic group which that can be substituted on aromatic nuclei; $R^3$, $R^4$, $R^5$, and $R^6$ are independently selected from halogen atoms and hydrogen atoms, p, q, r, and s may be 0, 1, or 2, with p+q=2 and r+s=2; and
    n is an integer ranging from 10 to 10,000.

12. The oilfield element of claim 11, wherein the aryl group is selected from p-xylylene, chloro-p-xylylene, di-chloro-p-xylylene, bromo-p-xylylene, cyano-p-xylylene, and ethyl-p-xylylene.

13. The oilfield element of claim 11, wherein the elastomer substrate comprises an elastomer selected from natural and man-made elastomers.

14. The oilfield element of claim 11 selected from tubing, jointed pipe, sucker rods, electric submersible pumps, submersible pump motor protector bags, packers, packer elements, blow out preventers, blow out preventer elements, O-rings, T-rings, centralizers, hangers, plugs, plug catchers, check valves, universal valves, spotting valves, differential valves, circulation valves, equalizing valves, safety valves, fluid flow control valves, sliding seals, connectors, disconnect tools, downhole filters, motorheads, retrieval and fishing tools, bottom hole assemblies, seal assemblies, snap latch assemblies, anchor latch assemblies, shear-type anchor latch assemblies, no-go locators, sensor protectors, gaskets, pump shaft seals, tube seals, valve seals, seals and insulators used in electrical components, seats used in fiber optic connections, pressure sealing elements for fluids and combinations thereof.

15. An oilfield assembly for exploring, drilling, or producing hydrocarbons, comprising:
one or more oilfield elements selected from tubing, jointed pipe, sucker rods, electric submersible pumps, submersible pump motor protector bags, packers, packer elements, blow out preventers, blow out preventer elements, O-rings, T-rings, centralizers, hangers, plugs, plug catchers, check valves, universal valves, spotting valves, differential valves, circulation valves, equalizing valves, safety valves, fluid flow control valves, sliding seals, connectors, disconnect tools, downhole filters, motorheads, retrieval and fishing tools, bottom hole assemblies, seal assemblies, snap latch assemblies, anchor latch assemblies, shear-type anchor latch assemblies, no-go locators, sensor protectors, gaskets, pump shaft seals, tube seals, valve seals, seals and insulators used in electrical components, seats used in fiber optic connections, pressure sealing elements for fluids, and combinations thereof,
wherein at least one of the one or more oilfield elements comprises a polymeric substrate having a polymeric coating adhered to at least a portion of the polymeric substrate, wherein
the polymeric coating comprises a polymer having the formula $-[R(R^1_x)(R^2_y)]_n-$, wherein R is C—C, aryl, or $-C(R^3_p)(R^4_q)-aryl-C(R^5_r)(R^6_s)-$, and n is an integer ranging from 10 to 10,000,
if R is C—C, then $R^1$ and $R^2$ are the same or different halogen atoms, x and y are integers ranging from 0 to 4, and x+y=4,
if R is aryl, $R^1$ and $R^2$ are the same or different and are any organic or inorganic group that can be substituted on aromatic nuclei, and x and y are integers ranging from 0 to m, and x+y≦m, wherein m is the total number of available aryl substitution positions,
if R is $-C(R^3_p)(R^4_q)-aryl-C(R^5_r)(R^6_s)-$, x and y are integers ranging from 0 to 4, and x+y≦m, wherein m is the maximum number of substitution positions on the aryl, $R^1$ and $R^2$ are attached to the aryl group and are independently selected from any organic or inorganic group that can be substituted on aromatic nuctei, $R^3$, $R^4$, $R^5$, and $R^6$ are independently selected from halogen atoms and hydrogen atoms, p, g, r, and s may be 0, 1, or 2, with p+q=2 and r+s=2.

16. A method comprising:
(a) selecting one or more oilfield elements having a component comprising a polymeric substrate having a polymeric coating adhered to at least a potion of the polymeric substrate, wherein:
the polymeric coating comprises a polymer having the formula $-[R(R^1_x)(R^2_y)]_n-$, wherein R is C—C, aryl, or $-C(R^3_p)(R^4_g)-aryl-C(R^5_r)(R^6_s)-$, and n is an integer ranging from 10 to 10,000,
if R is C—C, then $R^1$ and $R^2$ are the same or different halogen atoms, x and y are integers ranging from 0 to 4, and x+y=4,
if R is aryl, $R^1$ and $R^2$ are the same or different and are any organic or inorganic group that can be substituted on aromatic nuclei, and x and y are integers ranging from 0 to m, and x+y≦m, wherein m is the maximum number of substitution positions on the aryl,
if R is $-C(R^3_p)(R^4_q)-aryl-C(R^5_r)(R^6_s)-$, x and y are integers ranging from 0 to m, and x+y≦m, wherein m is the maximum number of substitution positions on the aryl, $R^1$ and $R^2$ are attached to the aryl group and are independently selected from any organic or inorganic group that can be substituted on aromatic nuclei, $R^3$, $R^4$, $R^5$, and $R^6$ are independently selected from halogen atoms and hydrogen atoms, p, g, r, and s may be 0, 1, or 2, with p+q=2 and r+s=2; and
(b) using the oilfield element in an oilfield operation, thus exposing the oilfield element to an oilfield environment.

17. The method of claim 16 wherein the one or more oilfieid elements are selected from tubing, jointed pipe, sucker rods, electric submersible pumps, submersible pump motor protector bags, packers, packer elements, blow out preventers, blow out preventer elements, O-rings, T-rings, centralizers, hangers, plugs, plug catchers, check valves, universal valves, spotting valves, differential valves, circulation valves, equalizing valves, safety valves, fluid flow control valves, sliding seals, connectors, disconnect tools, downhole filters, motorheads, retrieval and fishing tools, bottom hole assemblies, seal assemblies, snap latch assemblies, anchor latch assemblies, shear-type anchor latch assemblies, no-go locators, sensor protectors, gaskets, pump shaft seals, tube seals, valve seals, seals and insulators used in electrical components, seals used in fiber optic connections, pressure sealing elements for fluids, and combinations thereof.

18. The method of claim 17 wherein the one or more oilfield elements include an electric submersible pump, and the element wherein the electric submersible pump has a protector bag comprising a polymeric substrate having a polymeric coating adhered to at least a portion of the polymeric substrate.

* * * * *